United States Patent
Klein et al.

(10) Patent No.: US 10,137,976 B2
(45) Date of Patent: Nov. 27, 2018

(54) AIRFOILS FOR ROTOR BLADES OF ROTARY WING AIRCRAFTS

(71) Applicant: AIRBUS HELICOPTERS DEUTSCHLAND GMBH, Donauworth (DE)

(72) Inventors: Alexander Klein, Augsburg (DE); Jonas Gude, Boeblingen (DE); Thorsten Lutz, Waldenbuch (DE); Claas-Hinrik Rohardt, Braunschweig (DE); Kai Richter, Goettingen (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 415 days.

(21) Appl. No.: 15/181,671

(22) Filed: Jun. 14, 2016

(65) Prior Publication Data

US 2017/0001710 A1    Jan. 5, 2017

(30) Foreign Application Priority Data

Jul. 3, 2015  (EP) .................................... 15400028

(51) Int. Cl.
*B64C 3/14*        (2006.01)
*B64C 27/467*      (2006.01)
*F04D 29/18*       (2006.01)
*F04D 29/38*       (2006.01)

(52) U.S. Cl.
CPC .............. *B64C 3/14* (2013.01); *B64C 27/467* (2013.01); *F04D 29/181* (2013.01); *F04D 29/384* (2013.01)

(58) Field of Classification Search
CPC ......... B64C 3/14; B64C 11/18; B64C 27/467; F04D 29/181; F04D 29/384
See application file for complete search history.

(56) References Cited

U.S. PATENT DOCUMENTS

| | | | | |
|---|---|---|---|---|
| 3,728,045 A | * | 4/1973 | Balch ................... | B64C 27/467 416/223 R |
| 4,142,837 A | * | 3/1979 | de Simone ............ | B64C 27/467 416/223 R |
| 4,314,795 A | * | 2/1982 | Dadone ................. | B64C 27/463 244/35 R |
| 4,412,664 A | * | 11/1983 | Noonan ................ | B64C 27/467 244/35 A |
| 4,459,083 A | * | 7/1984 | Bingham ................ | B64C 11/18 244/35 R |

(Continued)

OTHER PUBLICATIONS

Extended European Search Report for European Application No. EP 15400028.5, Completed by the European Patent Office, dated Jan. 4, 2016, 5 Pages

*Primary Examiner* — Igor Kershteyn
(74) *Attorney, Agent, or Firm* — Brooks Kushman P.C.

(57) ABSTRACT

An airfoil for a rotor blade of a rotary wing aircraft, the airfoil having a predetermined maximum thickness to chord ratio and comprising, between a leading edge and a trailing edge, an extrados and an intrados, the intrados being defined by predetermined intrados coordinate value pairs and the extrados being defined by predetermined extrados coordinate value pairs, wherein a maximum error of each one of the predetermined intrados coordinate value pairs and the predetermined extrados coordinate value pairs amounts to ±3%.

16 Claims, 4 Drawing Sheets

(56) References Cited

U.S. PATENT DOCUMENTS

| | | | | |
|---|---|---|---|---|
| 4,569,633 | A | * | 2/1986 | Flemming, Jr. ....... B64C 27/463 416/228 |
| 4,744,728 | A | * | 5/1988 | Lednicer ............... B64C 27/467 416/223 R |
| 4,911,612 | A | * | 3/1990 | Rodde .................... B64C 11/18 416/223 R |
| 5,344,102 | A | * | 9/1994 | Nakadate .............. B64C 27/467 244/34 R |
| 5,609,472 | A | * | 3/1997 | Obukata ............... B64C 27/467 416/223 R |
| 5,791,878 | A | * | 8/1998 | Wainauski ............. B64C 11/18 416/223 R |
| 5,957,662 | A | | 9/1999 | Aoki et al. |
| 5,961,290 | A | * | 10/1999 | Aoki .................... B64C 27/467 416/223 R |
| 6,164,918 | A | * | 12/2000 | Aoki .................... B64C 27/467 416/223 R |
| 6,315,522 | B1 | * | 11/2001 | Yamakawa ........... B64C 27/467 416/223 R |
| 6,361,279 | B1 | | 3/2002 | Rodde et al. |
| 7,854,593 | B2 | * | 12/2010 | Owen ........................ B64C 3/14 244/35 R |
| 9,284,050 | B2 | * | 3/2016 | Bagai .................... B64C 27/463 |

\* cited by examiner

AIRFOILS FOR ROTOR BLADES OF ROTARY WING AIRCRAFTS

CROSS REFERENCE TO RELATED APPLICATION

This application claims priority to European patent application No. EP 15400028.5, filed Jul. 3, 2015, the disclosure of which is incorporated in its entirety by reference herein.

BACKGROUND OF THE INVENTION (1) Field of the Invention

The invention is related to an airfoil for a rotor blade of a rotary wing aircraft, said airfoil having a predetermined maximum thickness to chord ratio. The invention is further related to a rotor blade of a rotary wing aircraft.

(2) Description of Related Art

Airfoils for rotor blades of rotary wing aircrafts are generally characterized by an extrados and an intrados that are arranged between corresponding leading and trailing edges of the airfoils and that are defined by predetermined intrados coordinate value pairs x/c, $y_{int}/c$ and predetermined extrados coordinate value pairs x/c, $y_{ext}/c$. Therein, x is a distance from a leading edge to a trailing edge along a chord line of the airfoil, c is a length of the airfoil in chord direction, $y_{int}$ is a distance between the chord line and a respective intrados surface and $y_{ext}$ is a distance between the chord line and a respective extrados surface. The airfoils are usually further characterized by associated predetermined maximum thickness to chord ratios, as well as by leading edge radiuses r/c of corresponding leading edge circles and their center positions x/c and $y_{int}/c$ or $y_{ext}/c$.

The documents U.S. Pat. No. 5,957,662 A and U.S. Pat. No. 6,315,522 B1 describe such airfoils and illustrate exemplary tables of values that comprise values for predetermined intrados coordinate value pairs x/c, $y_{int}/c$ and predetermined extrados coordinate value pairs x/c, $y_{ext}/c$. More specifically, the document U.S. Pat. No. 5,957,662 A describes an airfoil with a maximum thickness to chord ratio of 8%, a leading edge radius r/c=0.00844 and corresponding leading edge circle center positions x/c=0.00842 and $y_{ext}/c$=0.00064. The document U.S. Pat. No. 6,315,522 B1 describes an airfoil with a maximum thickness to chord ratio of 10%, a leading edge radius r/c=0.0096 and corresponding leading edge circle center positions x/c=0.0097 and $y_{int}/c$=−0.0018.

Furthermore, the document U.S. Pat. No. 6,361,279 B1 describes airfoils with maximum thickness to chord ratios of 12% (Table 3) and 9% (Table 5). Nevertheless, for these airfoils no leading edge radiuses r/c of corresponding leading edge circles and their center positions x/c and $y_{int}/c$ or $y_{ext}/c$ are indicated. Instead, maximum camber positions and ratios of maximal camber to maximal thickness are used for further characterizing these airfoils.

However, these airfoils only provide for a restricted maximum lift capacity and a comparatively high aerodynamic drag. Furthermore, they only provide for restricted hover and forward flight performances.

BRIEF SUMMARY OF THE INVENTION

It is, therefore, an object of the present invention to provide a new airfoil for a rotor blade of a rotary wing aircraft, said airfoil providing for a reduced aerodynamic drag, an improved maximum lift capacity and improved hover and forward flight performances of said rotor blade. It is a further object of the present invention to provide a new rotor blade having an airfoil that provides for a reduced aerodynamic drag, an improved maximum lift capacity and improved hover and forward flight performances.

This object is solved by an airfoil for a rotor blade of a rotary wing aircraft, said airfoil having a maximum thickness to chord ratio of 12%. This object is also solved by an airfoil for a rotor blade of a rotary wing aircraft, said airfoil having a maximum thickness to chord ratio of 9%. This object is further solved by an airfoil for a rotor blade of a rotary wing aircraft, said airfoil having a maximum thickness to chord ratio of 8%.

Advantageously, these inventive airfoils exhibit a reduced aerodynamic drag by means of extended laminarity. Furthermore, an underlying maximum lift capacity is improved. Moreover, more negative, i. e. nose-down, static pitching moments around the quarter-chord of the airfoils due to the applied modifications to the camber line are acceptable, since dynamic loads as seen in numerical simulations and wind tunnel measurements prove to remain within those of prior art airfoils.

More specifically, the inventive airfoils exhibit reduced aerodynamic drag compared to prior art airfoils due to extended laminar running lengths on the upper side, i. e. the extrados. This is achieved by an improved leading edge geometry and by introducing a well-defined main pressure recovery at a downstream position, i. e. towards the trailing edge of the airfoil. These measures further enable the reduction of suction peaks and thereby allow for higher maximum lift coefficients at moderate Mach numbers as well as the reduction of transonic shocks at high lift coefficients. Furthermore, the application of the inventive airfoils provides for improved hover and forward flight performances of a given rotor of a rotary wing aircraft.

Preferably, at least one of the inventive airfoils, more preferably at least two of the inventive airfoils and, preferentially, all inventive airfoils are applied to a single rotor blade of a given rotary wing aircraft. In other words, such a single rotor blade is provided with differing geometric shapes at different locations over its radial extension. Areas between these different locations are preferably provided with geometric shapes that result from interpolations between corresponding adjacent airfoils.

More specifically, according to one aspect of the present invention an airfoil for a rotor blade of a rotary wing aircraft that has a maximum thickness to chord ratio of 12% comprises, between a leading edge and a trailing edge, an extrados and an intrados. The intrados is defined by predetermined intrados coordinate value pairs x/c, $y_{int}/c$ and the extrados is defined by predetermined extrados coordinate value pairs x/c, $y_{ext}/c$. Therein, x is a distance from the leading edge to the trailing edge along a chord line of the airfoil, c is a length of the airfoil in chord direction, $y_{int}$ is a distance between the chord line and a respective intrados surface and $y_{ext}$ is a distance between the chord line and a respective extrados surface. The predetermined intrados coordinate value pairs x/c, $y_{int}/c$ and the predetermined extrados coordinate value pairs x/c, $y_{ext}/c$ are defined according to Table 1 below.

TABLE 1

| x/c | $y_{int}/c$ | x/c | $y_{ext}/c$ |
|---|---|---|---|
| 0.000000 | 0.000000 | 0.000000 | 0.000000 |
| 0.000077 | −0.001398 | 0.000077 | 0.001446 |
| 0.000307 | −0.002749 | 0.000306 | 0.002940 |

TABLE 1-continued

| x/c | $y_{int}/c$ | x/c | $y_{ext}/c$ |
|---|---|---|---|
| 0.000690 | −0.004055 | 0.000689 | 0.004483 |
| 0.001226 | −0.005315 | 0.001226 | 0.006071 |
| 0.001915 | −0.006532 | 0.001914 | 0.007707 |
| 0.002756 | −0.007707 | 0.002756 | 0.009385 |
| 0.003750 | −0.008838 | 0.003750 | 0.011105 |
| 0.004897 | −0.009926 | 0.004896 | 0.012865 |
| 0.006195 | −0.010971 | 0.006194 | 0.014662 |
| 0.007644 | −0.011971 | 0.007644 | 0.016492 |
| 0.009245 | −0.012928 | 0.009244 | 0.018354 |
| 0.010996 | −0.013840 | 0.010995 | 0.020243 |
| 0.012897 | −0.014710 | 0.012896 | 0.022155 |
| 0.014947 | −0.015537 | 0.014947 | 0.024087 |
| 0.017146 | −0.016325 | 0.017146 | 0.026035 |
| 0.019494 | −0.017076 | 0.019494 | 0.027995 |
| 0.021989 | −0.017793 | 0.021989 | 0.029962 |
| 0.024631 | −0.018478 | 0.024630 | 0.031932 |
| 0.027418 | −0.019136 | 0.027418 | 0.033902 |
| 0.030351 | −0.019769 | 0.030351 | 0.035867 |
| 0.033429 | −0.020380 | 0.033428 | 0.037823 |
| 0.036649 | −0.020971 | 0.036649 | 0.039766 |
| 0.040012 | −0.021544 | 0.040012 | 0.041694 |
| 0.043517 | −0.022102 | 0.043517 | 0.043603 |
| 0.047162 | −0.022644 | 0.047162 | 0.045489 |
| 0.050946 | −0.023172 | 0.050946 | 0.047350 |
| 0.054869 | −0.023685 | 0.054868 | 0.049183 |
| 0.058929 | −0.024185 | 0.058928 | 0.050985 |
| 0.063124 | −0.024671 | 0.063124 | 0.052754 |
| 0.067454 | −0.025143 | 0.067454 | 0.054487 |
| 0.071918 | −0.025602 | 0.071917 | 0.056181 |
| 0.076514 | −0.026048 | 0.076513 | 0.057837 |
| 0.081240 | −0.026482 | 0.081239 | 0.059451 |
| 0.086096 | −0.026902 | 0.086095 | 0.061022 |
| 0.091079 | −0.027311 | 0.091078 | 0.062551 |
| 0.096189 | −0.027708 | 0.096188 | 0.064035 |
| 0.101424 | −0.028093 | 0.101423 | 0.065474 |
| 0.106782 | −0.028467 | 0.106781 | 0.066868 |
| 0.112262 | −0.028830 | 0.112261 | 0.068216 |
| 0.117862 | −0.029182 | 0.117862 | 0.069519 |
| 0.123581 | −0.029524 | 0.123580 | 0.070777 |
| 0.129416 | −0.029853 | 0.129416 | 0.071989 |
| 0.135367 | −0.030173 | 0.135366 | 0.073156 |
| 0.141431 | −0.030481 | 0.141430 | 0.074278 |
| 0.147607 | −0.030778 | 0.147606 | 0.075355 |
| 0.153892 | −0.031064 | 0.153891 | 0.076387 |
| 0.160285 | −0.031338 | 0.160284 | 0.077373 |
| 0.166784 | −0.031601 | 0.166783 | 0.078315 |
| 0.173388 | −0.031852 | 0.173387 | 0.079210 |
| 0.180093 | −0.032092 | 0.180092 | 0.080058 |
| 0.186899 | −0.032319 | 0.186898 | 0.080856 |
| 0.193802 | −0.032535 | 0.193802 | 0.081606 |
| 0.200802 | −0.032739 | 0.200801 | 0.082302 |
| 0.207896 | −0.032930 | 0.207895 | 0.082944 |
| 0.215082 | −0.033110 | 0.215081 | 0.083529 |
| 0.222358 | −0.033276 | 0.222357 | 0.084054 |
| 0.229722 | −0.033431 | 0.229721 | 0.084516 |
| 0.237171 | −0.033574 | 0.237170 | 0.084914 |
| 0.244703 | −0.033703 | 0.244702 | 0.085243 |
| 0.252317 | −0.033819 | 0.252316 | 0.085502 |
| 0.260010 | −0.033924 | 0.260009 | 0.085689 |
| 0.267779 | −0.034017 | 0.267778 | 0.085805 |
| 0.275622 | −0.034096 | 0.275621 | 0.085848 |
| 0.283538 | −0.034166 | 0.283537 | 0.085821 |
| 0.291523 | −0.034222 | 0.291522 | 0.085722 |
| 0.299575 | −0.034269 | 0.299574 | 0.085557 |
| 0.307693 | −0.034304 | 0.307692 | 0.085328 |
| 0.315873 | −0.034330 | 0.315872 | 0.085037 |
| 0.324113 | −0.034346 | 0.324112 | 0.084689 |
| 0.332411 | −0.034353 | 0.332410 | 0.084288 |
| 0.340764 | −0.034350 | 0.340763 | 0.083837 |
| 0.349170 | −0.034340 | 0.349169 | 0.083342 |
| 0.357627 | −0.034321 | 0.357626 | 0.082805 |
| 0.366131 | −0.034294 | 0.366130 | 0.082231 |
| 0.374680 | −0.034259 | 0.374679 | 0.081625 |
| 0.383273 | −0.034214 | 0.383272 | 0.080987 |
| 0.391905 | −0.034163 | 0.391905 | 0.080323 |
| 0.400576 | −0.034103 | 0.400575 | 0.079635 |
| 0.409282 | −0.034035 | 0.409281 | 0.078926 |
| 0.418020 | −0.033958 | 0.418019 | 0.078196 |
| 0.426788 | −0.033873 | 0.426787 | 0.077447 |
| 0.435584 | −0.033779 | 0.435583 | 0.076679 |
| 0.444405 | −0.033678 | 0.444404 | 0.075896 |
| 0.453248 | −0.033567 | 0.453247 | 0.075093 |
| 0.462110 | −0.033448 | 0.462109 | 0.074273 |
| 0.470990 | −0.033322 | 0.470989 | 0.073436 |
| 0.479884 | −0.033187 | 0.479883 | 0.072580 |
| 0.488790 | −0.033045 | 0.488789 | 0.071707 |
| 0.497705 | −0.032894 | 0.497705 | 0.070816 |
| 0.506627 | −0.032735 | 0.506626 | 0.069907 |
| 0.515553 | −0.032568 | 0.515552 | 0.068981 |
| 0.524480 | −0.032393 | 0.524479 | 0.068037 |
| 0.533405 | −0.032210 | 0.533405 | 0.067076 |
| 0.542327 | −0.032017 | 0.542326 | 0.066097 |
| 0.551242 | −0.031818 | 0.551242 | 0.065104 |
| 0.560148 | −0.031609 | 0.560147 | 0.064093 |
| 0.569042 | −0.031394 | 0.569042 | 0.063069 |
| 0.577922 | −0.031169 | 0.577921 | 0.062029 |
| 0.586785 | −0.030936 | 0.586784 | 0.060976 |
| 0.595627 | −0.030694 | 0.595627 | 0.059910 |
| 0.604448 | −0.030445 | 0.604447 | 0.058833 |
| 0.613244 | −0.030187 | 0.613243 | 0.057745 |
| 0.622011 | −0.029919 | 0.622011 | 0.056647 |
| 0.630750 | −0.029641 | 0.630750 | 0.055540 |
| 0.639456 | −0.029355 | 0.639455 | 0.054426 |
| 0.648126 | −0.029059 | 0.648125 | 0.053303 |
| 0.656758 | −0.028751 | 0.656758 | 0.052171 |
| 0.665351 | −0.028433 | 0.665350 | 0.051030 |
| 0.673900 | −0.028103 | 0.673900 | 0.049879 |
| 0.682404 | −0.027759 | 0.682404 | 0.048717 |
| 0.690860 | −0.027402 | 0.690860 | 0.047544 |
| 0.699266 | −0.027028 | 0.699266 | 0.046357 |
| 0.707619 | −0.026640 | 0.707619 | 0.045158 |
| 0.715917 | −0.026232 | 0.715917 | 0.043942 |
| 0.724157 | −0.025804 | 0.724157 | 0.042711 |
| 0.732337 | −0.025356 | 0.732336 | 0.041464 |
| 0.740454 | −0.024883 | 0.740454 | 0.040199 |
| 0.748506 | −0.024388 | 0.748506 | 0.038920 |
| 0.756491 | −0.023867 | 0.756491 | 0.037626 |
| 0.764407 | −0.023322 | 0.764406 | 0.036317 |
| 0.772250 | −0.022751 | 0.772249 | 0.034996 |
| 0.780019 | −0.022156 | 0.780018 | 0.033664 |
| 0.787711 | −0.021536 | 0.787710 | 0.032324 |
| 0.795324 | −0.020893 | 0.795324 | 0.030978 |
| 0.802856 | −0.020227 | 0.802856 | 0.029628 |
| 0.810305 | −0.019541 | 0.810305 | 0.028278 |
| 0.817668 | −0.018834 | 0.817668 | 0.026929 |
| 0.824944 | −0.018109 | 0.824944 | 0.025584 |
| 0.832130 | −0.017366 | 0.832129 | 0.024246 |
| 0.839223 | −0.016608 | 0.839223 | 0.022916 |
| 0.846223 | −0.015835 | 0.846223 | 0.021597 |
| 0.853126 | −0.015050 | 0.853126 | 0.020291 |
| 0.859932 | −0.014255 | 0.859931 | 0.019000 |
| 0.866637 | −0.013451 | 0.866636 | 0.017726 |
| 0.873240 | −0.012643 | 0.873239 | 0.016472 |
| 0.879738 | −0.011831 | 0.879738 | 0.015238 |
| 0.886131 | −0.011019 | 0.886131 | 0.014030 |
| 0.892416 | −0.010213 | 0.892416 | 0.012851 |
| 0.898591 | −0.009416 | 0.898591 | 0.011704 |
| 0.904655 | −0.008633 | 0.904655 | 0.010596 |
| 0.910605 | −0.007871 | 0.910605 | 0.009532 |
| 0.916440 | −0.007134 | 0.916440 | 0.008516 |
| 0.922158 | −0.006430 | 0.922158 | 0.007556 |
| 0.927758 | −0.005764 | 0.927758 | 0.006655 |
| 0.933237 | −0.005141 | 0.933237 | 0.005821 |
| 0.938595 | −0.004564 | 0.938595 | 0.005056 |
| 0.943830 | −0.004039 | 0.943830 | 0.004363 |
| 0.948939 | −0.003564 | 0.948939 | 0.003743 |
| 0.953922 | −0.003142 | 0.953922 | 0.003197 |
| 0.956325 | −0.002953 | 0.958777 | 0.002723 |
| 0.959739 | −0.002725 | 0.963503 | 0.002318 |
| 0.963158 | −0.002563 | 0.968098 | 0.001979 |
| 0.966579 | −0.002457 | 0.970001 | 0.001854 |
| 0.970001 | −0.002402 | 0.976001 | 0.001909 |
| 0.976001 | −0.002347 | 0.982001 | 0.001964 |
| 0.982001 | −0.002293 | 0.988001 | 0.002019 |

TABLE 1-continued

| x/c | $y_{int}/c$ | x/c | $y_{ext}/c$ |
|---|---|---|---|
| 0.988001 | −0.002238 | 0.994000 | 0.002073 |
| 0.994000 | −0.002183 | 1.000000 | 0.002128 |
| 1.000000 | −0.002128 | | |

A maximum error of each one of the predetermined intrados coordinate value pairs x/c, $y_{int}/c$ and the predetermined extrados coordinate value pairs x/c, $y_{ext}/c$ preferentially amounts to ±3%.

According to a preferred embodiment of the present invention, an airfoil for a rotor blade of a rotary wing aircraft with a maximum thickness to chord ratio within a range from 9% to 15% is provided that comprises intrados coordinate value pairs and extrados coordinate value pairs, which are determined on the basis of a reference airfoil that is defined by the airfoil having the maximum thickness to chord ratio of 12% as described above.

According to a further preferred embodiment of the present invention, an associated leading edge radius of a leading edge circle that defines an underlying curvature at the leading edge of the airfoil having the maximum thickness to chord ratio of 12% as described above amounts to r/c=0.01314. The leading edge circle has its associated center of circle located at x/c=0.01314 and $y_{int}/c=y_{ext}/c=0.00000$.

According to a further preferred embodiment of the present invention, a trailing edge tab is provided at the trailing edge of the airfoil. The trailing edge tab is defined by an at least essentially straight and parallel intrados and extrados.

According to a further preferred embodiment of the present invention, the trailing edge tab comprises a length in a range from 2% to 10% of the length of the airfoil in chord direction with a maximum inclination error of ±5° relative to the chord line of the airfoil.

According to another aspect of the present invention, an airfoil for a rotor blade of a rotary wing aircraft that has a maximum thickness to chord ratio of 9% comprises, between a leading edge and a trailing edge, an extrados and an intrados. The intrados is defined by predetermined intrados coordinate value pairs x/c, $y_{int}/c$ and the extrados is defined by predetermined extrados coordinate value pairs x/c, $y_{ext}/c$. Therein, x is a distance from the leading edge to the trailing edge along a chord line of the airfoil, c is a length of the airfoil in chord direction, $y_{int}$ is a distance between the chord line and a respective intrados surface and $y_{ext}$ is a distance between the chord line and a respective extrados surface. The predetermined intrados coordinate value pairs x/c, $y_{int}/c$ and the predetermined extrados coordinate value pairs x/c, $y_{ext}/c$ are defined according to Table 2 below.

TABLE 2

| x/c | $y_{int}/c$ | x/c | $y_{ext}/c$ |
|---|---|---|---|
| 0.000000 | 0.000079 | 0.000000 | 0.000079 |
| 0.000100 | −0.000821 | 0.000100 | 0.001156 |
| 0.000400 | −0.001602 | 0.000400 | 0.002431 |
| 0.000901 | −0.002314 | 0.000901 | 0.003855 |
| 0.001601 | −0.002993 | 0.001601 | 0.005382 |
| 0.002500 | −0.003661 | 0.002500 | 0.006983 |
| 0.003599 | −0.004331 | 0.003599 | 0.008637 |
| 0.004896 | −0.005009 | 0.004896 | 0.010336 |
| 0.006392 | −0.005694 | 0.006392 | 0.012070 |
| 0.008086 | −0.006381 | 0.008086 | 0.013836 |
| 0.009977 | −0.007067 | 0.009977 | 0.015625 |

TABLE 2-continued

| x/c | $y_{int}/c$ | x/c | $y_{ext}/c$ |
|---|---|---|---|
| 0.012063 | −0.007745 | 0.012063 | 0.017432 |
| 0.014346 | −0.008412 | 0.014346 | 0.019249 |
| 0.016823 | −0.009067 | 0.016823 | 0.021067 |
| 0.019494 | −0.009707 | 0.019494 | 0.022879 |
| 0.022357 | −0.010332 | 0.022357 | 0.024678 |
| 0.025412 | −0.010940 | 0.025412 | 0.026457 |
| 0.028658 | −0.011532 | 0.028658 | 0.028211 |
| 0.032092 | −0.012105 | 0.032092 | 0.029937 |
| 0.035714 | −0.012660 | 0.035714 | 0.031632 |
| 0.039523 | −0.013196 | 0.039523 | 0.033296 |
| 0.043517 | −0.013713 | 0.043517 | 0.034926 |
| 0.047694 | −0.014211 | 0.047694 | 0.036523 |
| 0.052053 | −0.014692 | 0.052053 | 0.038087 |
| 0.056592 | −0.015154 | 0.056592 | 0.039615 |
| 0.061309 | −0.015598 | 0.061309 | 0.041106 |
| 0.066203 | −0.016025 | 0.066203 | 0.042558 |
| 0.071272 | −0.016435 | 0.071272 | 0.043968 |
| 0.076513 | −0.016831 | 0.076513 | 0.045335 |
| 0.081926 | −0.017212 | 0.081926 | 0.046656 |
| 0.087506 | −0.017580 | 0.087506 | 0.047929 |
| 0.093254 | −0.017935 | 0.093254 | 0.049154 |
| 0.099165 | −0.018280 | 0.099165 | 0.050329 |
| 0.105239 | −0.018615 | 0.105239 | 0.051455 |
| 0.111472 | −0.018941 | 0.111472 | 0.052533 |
| 0.117862 | −0.019258 | 0.117862 | 0.053563 |
| 0.124407 | −0.019567 | 0.124407 | 0.054546 |
| 0.131105 | −0.019868 | 0.131105 | 0.055482 |
| 0.137952 | −0.020161 | 0.137952 | 0.056373 |
| 0.144946 | −0.020446 | 0.144946 | 0.057218 |
| 0.152085 | −0.020723 | 0.152085 | 0.058018 |
| 0.159365 | −0.020991 | 0.159365 | 0.058772 |
| 0.166784 | −0.021250 | 0.166784 | 0.059482 |
| 0.174339 | −0.021500 | 0.174339 | 0.060148 |
| 0.182027 | −0.021740 | 0.182027 | 0.060769 |
| 0.189845 | −0.021971 | 0.189845 | 0.061348 |
| 0.197791 | −0.022193 | 0.197791 | 0.061885 |
| 0.205860 | −0.022405 | 0.205860 | 0.062380 |
| 0.214050 | −0.022609 | 0.214050 | 0.062833 |
| 0.222358 | −0.022805 | 0.222358 | 0.063246 |
| 0.230781 | −0.022992 | 0.230781 | 0.063619 |
| 0.239314 | −0.023172 | 0.239314 | 0.063953 |
| 0.247956 | −0.023345 | 0.247956 | 0.064250 |
| 0.256703 | −0.023511 | 0.256703 | 0.064510 |
| 0.265551 | −0.023668 | 0.265551 | 0.064736 |
| 0.274497 | −0.023818 | 0.274497 | 0.064928 |
| 0.283537 | −0.023961 | 0.283537 | 0.065087 |
| 0.292669 | −0.024095 | 0.292669 | 0.065213 |
| 0.301888 | −0.024222 | 0.301888 | 0.065306 |
| 0.311191 | −0.024341 | 0.311191 | 0.065366 |
| 0.320574 | −0.024453 | 0.320574 | 0.065392 |
| 0.330034 | −0.024557 | 0.330034 | 0.065382 |
| 0.339567 | −0.024654 | 0.339567 | 0.065337 |
| 0.349170 | −0.024742 | 0.349170 | 0.065255 |
| 0.358838 | −0.024822 | 0.358838 | 0.065136 |
| 0.368569 | −0.024893 | 0.368569 | 0.064980 |
| 0.378357 | −0.024954 | 0.378357 | 0.064786 |
| 0.388201 | −0.025006 | 0.388201 | 0.064554 |
| 0.398095 | −0.025047 | 0.398095 | 0.064285 |
| 0.408036 | −0.025078 | 0.408036 | 0.063977 |
| 0.418020 | −0.025097 | 0.418020 | 0.063630 |
| 0.428043 | −0.025106 | 0.428043 | 0.063246 |
| 0.438102 | −0.025104 | 0.438102 | 0.062822 |
| 0.448192 | −0.025090 | 0.448192 | 0.062359 |
| 0.458310 | −0.025065 | 0.458310 | 0.061857 |
| 0.468451 | −0.025027 | 0.468451 | 0.061314 |
| 0.478613 | −0.024977 | 0.478613 | 0.060730 |
| 0.488790 | −0.024914 | 0.488790 | 0.060105 |
| 0.498979 | −0.024838 | 0.498979 | 0.059437 |
| 0.509177 | −0.024750 | 0.509177 | 0.058725 |
| 0.519378 | −0.024648 | 0.519378 | 0.057968 |
| 0.529580 | −0.024534 | 0.529580 | 0.057165 |
| 0.539778 | −0.024406 | 0.539778 | 0.056314 |
| 0.549969 | −0.024265 | 0.549969 | 0.055414 |
| 0.560148 | −0.024110 | 0.560148 | 0.054465 |
| 0.570312 | −0.023943 | 0.570312 | 0.053466 |
| 0.580456 | −0.023762 | 0.580456 | 0.052418 |
| 0.590577 | −0.023568 | 0.590577 | 0.051323 |
| 0.600670 | −0.023360 | 0.600670 | 0.050182 |

TABLE 2-continued

| x/c | $y_{int}/c$ | x/c | $y_{ext}/c$ |
|---|---|---|---|
| 0.610733 | −0.023138 | 0.610733 | 0.048997 |
| 0.620761 | −0.022902 | 0.620761 | 0.047772 |
| 0.630750 | −0.022650 | 0.630750 | 0.046508 |
| 0.640696 | −0.022383 | 0.640696 | 0.045209 |
| 0.650596 | −0.022100 | 0.650596 | 0.043880 |
| 0.660446 | −0.021799 | 0.660446 | 0.042523 |
| 0.670241 | −0.021482 | 0.670241 | 0.041142 |
| 0.679979 | −0.021146 | 0.679979 | 0.039742 |
| 0.689655 | −0.020793 | 0.689655 | 0.038325 |
| 0.699266 | −0.020421 | 0.699266 | 0.036897 |
| 0.708808 | −0.020030 | 0.708808 | 0.035460 |
| 0.718277 | −0.019619 | 0.718277 | 0.034019 |
| 0.727670 | −0.019188 | 0.727670 | 0.032577 |
| 0.736983 | −0.018734 | 0.736983 | 0.031138 |
| 0.746212 | −0.018256 | 0.746212 | 0.029705 |
| 0.755355 | −0.017751 | 0.755355 | 0.028280 |
| 0.764406 | −0.017218 | 0.764406 | 0.026864 |
| 0.773364 | −0.016653 | 0.773364 | 0.025461 |
| 0.782224 | −0.016056 | 0.782224 | 0.024070 |
| 0.790983 | −0.015426 | 0.790983 | 0.022693 |
| 0.799638 | −0.014765 | 0.799638 | 0.021332 |
| 0.808185 | −0.014075 | 0.808185 | 0.019986 |
| 0.816622 | −0.013359 | 0.816622 | 0.018658 |
| 0.824944 | −0.012623 | 0.824944 | 0.017349 |
| 0.833149 | −0.011872 | 0.833149 | 0.016061 |
| 0.841233 | −0.011110 | 0.841233 | 0.014799 |
| 0.849193 | −0.010343 | 0.849193 | 0.013565 |
| 0.857027 | −0.009576 | 0.857027 | 0.012365 |
| 0.864731 | −0.008815 | 0.864731 | 0.011204 |
| 0.872303 | −0.008066 | 0.872303 | 0.010088 |
| 0.879738 | −0.007335 | 0.879738 | 0.009023 |
| 0.887036 | −0.006632 | 0.887036 | 0.008016 |
| 0.894192 | −0.005964 | 0.894192 | 0.007072 |
| 0.901204 | −0.005340 | 0.901204 | 0.006198 |
| 0.908069 | −0.004767 | 0.908069 | 0.005400 |
| 0.914785 | −0.004253 | 0.914785 | 0.004684 |
| 0.921349 | −0.003800 | 0.921349 | 0.004056 |
| 0.927758 | −0.003413 | 0.927758 | 0.003520 |
| 0.934010 | −0.003091 | 0.934010 | 0.003077 |
| 0.940103 | −0.002832 | 0.940103 | 0.002727 |
| 0.946035 | −0.002633 | 0.946035 | 0.002463 |
| 0.951802 | −0.002490 | 0.951802 | 0.002276 |
| 0.957403 | −0.002395 | 0.957403 | 0.002153 |
| 0.962836 | −0.002339 | 0.962836 | 0.002083 |
| 0.968098 | −0.002311 | 0.968098 | 0.002049 |
| 0.973188 | −0.002302 | 0.973188 | 0.002039 |
| 0.978104 | −0.002303 | 0.978104 | 0.002042 |
| 0.982843 | −0.002309 | 0.982843 | 0.002052 |
| 0.987404 | −0.002316 | 0.987404 | 0.002064 |
| 0.991785 | −0.002323 | 0.991785 | 0.002074 |
| 0.995984 | −0.002328 | 0.995984 | 0.002084 |
| 1.000000 | −0.002332 | 1.000000 | 0.002092 |

A maximum error of each one of the predetermined intrados coordinate value pairs x/c, $y_{int}/c$ and the predetermined extrados coordinate value pairs x/c, $y_{ext}/c$ preferentially amounts to ±3%.

According to a preferred embodiment of the present invention, an airfoil for a rotor blade of a rotary wing aircraft with a maximum thickness to chord ratio within a range from 7% to 12% is provided that comprises intrados coordinate value pairs and extrados coordinate value pairs, which are determined on the basis of a reference airfoil that is defined by the airfoil having the maximum thickness to chord ratio of 9% as described above.

According to a further preferred embodiment of the present invention, an associated leading edge radius of a leading edge circle that defines an underlying curvature at the leading edge of the airfoil having the maximum thickness to chord ratio of 9% as described above amounts to r/c=0.00481. The leading edge circle has its associated center of circle located at x/c=0.00481 and $y_{ext}/c$=0.00008.

According to a further preferred embodiment of the present invention, a trailing edge tab is provided at the trailing edge of the airfoil. The trailing edge tab is defined by an at least essentially straight and parallel intrados and extrados.

According to a further preferred embodiment of the present invention, the trailing edge tab comprises a length in a range from 2% to 10% of the length of the airfoil in chord direction with a maximum inclination error of ±5° relative to the chord line of the airfoil.

According to still another aspect of the present invention, an airfoil for a rotor blade of a rotary wing aircraft that has a maximum thickness to chord ratio of 8% comprises, between a leading edge and a trailing edge, an extrados and an intrados. The intrados is defined by predetermined intrados coordinate value pairs x/c, $y_{int}/c$ and the extrados is defined by predetermined extrados coordinate value pairs x/c, $y_{ext}/c$. Therein, x is a distance from the leading edge to the trailing edge along a chord line of the airfoil, c is a length of the airfoil in chord direction, $y_{int}$ is a distance between the chord line and a respective intrados surface and $y_{ext}$ is a distance between the chord line and a respective extrados surface. The predetermined intrados coordinate value pairs x/c, $y_{int}/c$ and the predetermined extrados coordinate value pairs x/c, $y_{ext}/c$ are defined according to Table 3 below.

TABLE 3

| x/c | $y_{int}/c$ | x/c | $y_{ext}/c$ |
|---|---|---|---|
| 0.000000 | 0.000215 | 0.000000 | 0.000215 |
| 0.000108 | −0.000757 | 0.000078 | 0.001200 |
| 0.000411 | −0.001747 | 0.000327 | 0.002240 |
| 0.000926 | −0.002750 | 0.000739 | 0.003360 |
| 0.001662 | −0.003727 | 0.001310 | 0.004558 |
| 0.002616 | −0.004655 | 0.002049 | 0.005839 |
| 0.003800 | −0.005525 | 0.002973 | 0.007227 |
| 0.005244 | −0.006340 | 0.004129 | 0.008754 |
| 0.006978 | −0.007128 | 0.005577 | 0.010448 |
| 0.009067 | −0.007908 | 0.007390 | 0.012337 |
| 0.011619 | −0.008697 | 0.009666 | 0.014451 |
| 0.014783 | −0.009530 | 0.012523 | 0.016812 |
| 0.018750 | −0.010418 | 0.016062 | 0.019413 |
| 0.023722 | −0.011352 | 0.020339 | 0.022198 |
| 0.029809 | −0.012304 | 0.025333 | 0.025063 |
| 0.036922 | −0.013230 | 0.030955 | 0.027888 |
| 0.044810 | −0.014099 | 0.037107 | 0.030586 |
| 0.053218 | −0.014906 | 0.043702 | 0.033107 |
| 0.061943 | −0.015652 | 0.050680 | 0.035432 |
| 0.070873 | −0.016345 | 0.058002 | 0.037567 |
| 0.079906 | −0.016990 | 0.065631 | 0.039529 |
| 0.088988 | −0.017593 | 0.073520 | 0.041336 |
| 0.098046 | −0.018154 | 0.081608 | 0.043000 |
| 0.107068 | −0.018678 | 0.089839 | 0.044528 |
| 0.116047 | −0.019169 | 0.098172 | 0.045923 |
| 0.124990 | −0.019632 | 0.106577 | 0.047188 |
| 0.133918 | −0.020068 | 0.115037 | 0.048325 |
| 0.142864 | −0.020484 | 0.123550 | 0.049337 |
| 0.151836 | −0.020880 | 0.132127 | 0.050232 |
| 0.160857 | −0.021259 | 0.140777 | 0.051020 |
| 0.169928 | −0.021623 | 0.149509 | 0.051716 |
| 0.179052 | −0.021972 | 0.158319 | 0.052338 |
| 0.188212 | −0.022307 | 0.167169 | 0.052894 |
| 0.197390 | −0.022628 | 0.176050 | 0.053383 |
| 0.206574 | −0.022937 | 0.184960 | 0.053815 |
| 0.215752 | −0.023233 | 0.193877 | 0.054190 |
| 0.224921 | −0.023518 | 0.202805 | 0.054506 |
| 0.234080 | −0.023790 | 0.211741 | 0.054767 |
| 0.243213 | −0.024051 | 0.220690 | 0.054973 |
| 0.252331 | −0.024302 | 0.229653 | 0.055126 |
| 0.261430 | −0.024541 | 0.238634 | 0.055229 |
| 0.270527 | −0.024771 | 0.247642 | 0.055289 |
| 0.279620 | −0.024990 | 0.256664 | 0.055307 |
| 0.288732 | −0.025198 | 0.265716 | 0.055288 |
| 0.297858 | −0.025397 | 0.274800 | 0.055241 |
| 0.307010 | −0.025588 | 0.283904 | 0.055169 |
| 0.316188 | −0.025771 | 0.293030 | 0.055078 |
| 0.325380 | −0.025946 | 0.302179 | 0.054971 |

TABLE 3-continued

| x/c | $y_{int}/c$ | x/c | $y_{ext}/c$ |
|---|---|---|---|
| 0.334565 | −0.026112 | 0.311343 | 0.054856 |
| 0.343733 | −0.026272 | 0.320511 | 0.054731 |
| 0.352895 | −0.026423 | 0.329689 | 0.054599 |
| 0.362062 | −0.026567 | 0.338869 | 0.054462 |
| 0.371226 | −0.026705 | 0.348043 | 0.054319 |
| 0.380408 | −0.026835 | 0.357211 | 0.054168 |
| 0.389592 | −0.026960 | 0.366378 | 0.054008 |
| 0.398773 | −0.027082 | 0.375537 | 0.053840 |
| 0.407948 | −0.027194 | 0.384693 | 0.053659 |
| 0.417114 | −0.027296 | 0.393848 | 0.053468 |
| 0.426264 | −0.027388 | 0.403006 | 0.053265 |
| 0.435411 | −0.027472 | 0.412163 | 0.053052 |
| 0.444557 | −0.027545 | 0.421324 | 0.052828 |
| 0.453708 | −0.027610 | 0.430488 | 0.052595 |
| 0.462868 | −0.027663 | 0.439656 | 0.052354 |
| 0.472038 | −0.027705 | 0.448824 | 0.052104 |
| 0.481218 | −0.027736 | 0.457990 | 0.051848 |
| 0.490405 | −0.027757 | 0.467151 | 0.051581 |
| 0.499600 | −0.027765 | 0.476316 | 0.051306 |
| 0.508797 | −0.027761 | 0.485468 | 0.051024 |
| 0.517989 | −0.027743 | 0.494612 | 0.050728 |
| 0.527173 | −0.027713 | 0.503750 | 0.050418 |
| 0.536346 | −0.027668 | 0.512886 | 0.050095 |
| 0.545491 | −0.027609 | 0.522011 | 0.049757 |
| 0.554621 | −0.027536 | 0.531136 | 0.049400 |
| 0.563731 | −0.027444 | 0.540266 | 0.049029 |
| 0.572814 | −0.027339 | 0.549383 | 0.048643 |
| 0.581885 | −0.027215 | 0.558500 | 0.048237 |
| 0.590939 | −0.027072 | 0.567617 | 0.047814 |
| 0.599982 | −0.026910 | 0.576733 | 0.047374 |
| 0.609025 | −0.026731 | 0.585841 | 0.046918 |
| 0.618071 | −0.026516 | 0.594933 | 0.046442 |
| 0.627122 | −0.026269 | 0.604018 | 0.045944 |
| 0.636179 | −0.025988 | 0.613076 | 0.045422 |
| 0.645255 | −0.025677 | 0.622116 | 0.044865 |
| 0.654342 | −0.025340 | 0.631136 | 0.044278 |
| 0.663446 | −0.024980 | 0.640125 | 0.043651 |
| 0.672559 | −0.024601 | 0.649101 | 0.042983 |
| 0.681681 | −0.024204 | 0.658056 | 0.042268 |
| 0.690809 | −0.023791 | 0.667004 | 0.041505 |
| 0.699940 | −0.023364 | 0.675947 | 0.040692 |
| 0.709072 | −0.022922 | 0.684895 | 0.039831 |
| 0.718204 | −0.022468 | 0.693854 | 0.038922 |
| 0.727323 | −0.022000 | 0.702833 | 0.037972 |
| 0.736438 | −0.021514 | 0.711841 | 0.036986 |
| 0.745545 | −0.021011 | 0.720869 | 0.035967 |
| 0.754646 | −0.020488 | 0.729930 | 0.034916 |
| 0.763749 | −0.019946 | 0.739005 | 0.033838 |
| 0.772838 | −0.019385 | 0.748093 | 0.032735 |
| 0.781925 | −0.018800 | 0.757187 | 0.031610 |
| 0.791017 | −0.018195 | 0.766273 | 0.030463 |
| 0.800106 | −0.017569 | 0.775334 | 0.029305 |
| 0.809195 | −0.016921 | 0.784371 | 0.028132 |
| 0.818292 | −0.016252 | 0.793385 | 0.026950 |
| 0.827400 | −0.015566 | 0.802375 | 0.025754 |
| 0.836515 | −0.014864 | 0.811351 | 0.024551 |
| 0.845633 | −0.014148 | 0.820321 | 0.023336 |
| 0.854759 | −0.013419 | 0.829305 | 0.022108 |
| 0.863883 | −0.012681 | 0.838309 | 0.020864 |
| 0.872989 | −0.011934 | 0.847334 | 0.019607 |
| 0.882064 | −0.011172 | 0.856389 | 0.018334 |
| 0.891090 | −0.010393 | 0.865463 | 0.017051 |
| 0.900055 | −0.009580 | 0.874538 | 0.015760 |
| 0.908968 | −0.008727 | 0.883610 | 0.014463 |
| 0.917793 | −0.007820 | 0.892663 | 0.013166 |
| 0.926569 | −0.006869 | 0.901705 | 0.011868 |
| 0.935039 | −0.005887 | 0.910726 | 0.010564 |
| 0.943157 | −0.004809 | 0.919634 | 0.009266 |
| 0.950722 | −0.003725 | 0.928288 | 0.007973 |
| 0.958140 | −0.003014 | 0.936612 | 0.006671 |
| 0.965683 | −0.002577 | 0.944461 | 0.005343 |
| 0.973486 | −0.002486 | 0.952013 | 0.004032 |
| 0.981658 | −0.002497 | 0.959220 | 0.003090 |
| 0.989505 | −0.002498 | 0.966334 | 0.002578 |
| 0.996281 | −0.002499 | 0.973827 | 0.002484 |
| 1.000000 | −0.002500 | 0.981787 | 0.002497 |
|  |  | 0.989536 | 0.002498 |
|  |  | 0.996283 | 0.002499 |
|  |  | 1.000000 | 0.002500 |

A maximum error of each one of the predetermined intrados coordinate value pairs x/c, $y_{int}/c$ and the predetermined extrados coordinate value pairs x/c, $y_{ext}/c$ preferentially amounts to ±3%.

According to a preferred embodiment of the present invention, an airfoil for a rotor blade of a rotary wing aircraft with a maximum thickness to chord ratio within a range from 6% to 10% is provided that comprises intrados coordinate value pairs and extrados coordinate value pairs, which are determined on the basis of a reference airfoil that is defined by the airfoil having the maximum thickness to chord ratio of 8% as described above.

According to a further preferred embodiment of the present invention, an associated leading edge radius of a leading edge circle that defines an underlying curvature at the leading edge of the airfoil having the maximum thickness to chord ratio of 8% as described above amounts to r/c=0.00502. The leading edge circle has its associated center of circle located at x/c=0.00502 and $y_{ext}/c$=0.00028.

According to a further preferred embodiment of the present invention, a trailing edge tab is provided at the trailing edge of the airfoil. The trailing edge tab is defined by an at least essentially straight and parallel intrados and extrados.

According to a further preferred embodiment of the present invention, the trailing edge tab comprises a length in a range from 2% to 10% of the length of the airfoil in chord direction with a maximum inclination error of ±5° relative to the chord line of the airfoil.

The above described object of the present invention is also solved by a rotor blade of a rotary wing aircraft that comprises at least one of the above-described airfoils.

Thus, new rotor blades and in particular new main rotor blades can be manufactured that allow for an improvement of an overall performance of a main rotor of a rotary wing aircraft, in particular of a helicopter, while maintaining favorable unsteady characteristics thereof, such as dynamic stall. Advantageously, such new main rotor blades can be provided with a particular geometric shape by application of the inventive airfoils at specific radial positions along these main rotor blades.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
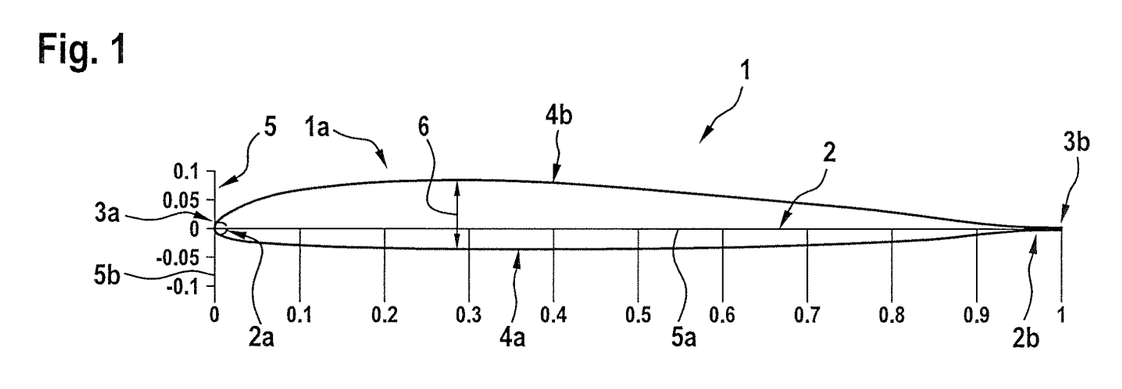
FIG. 1 shows a sectional view of a rotor blade of a rotary wing aircraft with an airfoil having a maximum thickness to chord ratio of 12%.

FIG. 1 shows a rotor blade 1 of a rotary wing aircraft that is provided with an airfoil 1a according to a first aspect of the present invention. The airfoil 1a preferably comprises a maximum thickness to chord ratio of 12%.

Illustratively, the airfoil 1a comprises a leading edge 3a and a trailing edge 3b, which are illustratively arranged on an airfoil chord line 2 of the airfoil 1a. The airfoil 1a illustratively further comprises an intrados 4a and an extrados 4b that extend between the leading edge 3a and the trailing edge 3b. The intrados 4a is defined by predetermined intrados coordinate value pairs x/c, $y_{int}/c$ and the extrados 4b is defined by predetermined extrados coordinate value pairs x/c, $y_{ext}/c$. Therein, x is a distance from the leading edge 3a to the trailing edge 3b along the chord line 2, c is a length of the airfoil 1a in chord direction, $y_{int}$ is a distance between the chord line 2 and a respective intrados surface and $y_{ext}$ is a distance between the chord line 2 and a respective extrados surface.

According to one aspect of the present invention, the predetermined intrados coordinate value pairs x/c, $y_{int}/c$ and the predetermined extrados coordinate value pairs x/c, $y_{ext}/c$ of the airfoil 1a that comprises a maximum thickness to chord ratio of 12% are defined according to Table 1 above. Preferably, a maximum error of each one of these predetermined intrados coordinate value pairs x/c, $y_{int}/c$ and these predetermined extrados coordinate value pairs x/c, $y_{ext}/c$ amounts to ±3%.

Preferably, the predetermined intrados coordinate value pairs x/c, $y_{int}/c$ and the predetermined extrados coordinate value pairs x/c, $y_{ext}/c$ of the airfoil 1a are determined in the region of the leading edge 3a on the basis of an associated leading edge circle 2a that, thus, defines an underlying curvature of the airfoil 1a at the leading edge 3a. The associated leading edge circle 2a preferably comprises a radius r with r/c=0.01314. The center of circle of the leading edge circle 2a is preferably located at x/c=0.01314 and $y_{int}/c=y_{ext}/c=0.00000$.

Preferentially, a maximum error of each one of the above described leading edge circle dimensions amounts to ±5%. This likewise applies to all leading edge circle dimensions that are described in the present patent application.

According to one aspect of the present invention, the trailing edge 3b is provided with an associated trailing edge tab 2b. The latter is preferentially defined by an at least essentially straight and parallel intrados 4a and extrados 4b. Preferably, the trailing edge tab 2b comprises a length in a range from 2% to 10% of the length of the airfoil 1a in chord direction with a maximum inclination error of ±5° relative to the chord line 2 of the airfoil 1a.

The predetermined intrados coordinate value pairs x/c, $y_{int}/c$ and the predetermined extrados coordinate value pairs x/c, $y_{ext}/c$ are exemplarily illustrated in an airfoil coordinate system 5, wherein the x/c values are outlined on a x-axis 5a and wherein the $y_{int}/c$ and the $y_{ext}/c$ values are outlined on a y-axis 5b. Accordingly, a chordwise position of a maximum thickness 6 of the airfoil 1a is illustrated on the basis of Table 1 above at the location x/c=0.284.

It should be noted that Table 1 above is illustrated by way of example with respect to the airfoil 1a having a maximum thickness to chord ratio of 12%. However, this airfoil 1a and, consequently Table 1, may also be used as a reference for defining other airfoils for rotor blades of rotary wing aircrafts with other maximum thickness to chord ratios. According to one aspect of the present invention, the airfoil 1a is used as a reference airfoil for determining intrados coordinate value pairs and extrados coordinate value pairs for an airfoil that comprises a maximum thickness to chord ratio within a range from 9% to 15%.

More specifically, the maximum thickness to chord ratio of 12% of the airfoil 1a at the location x/c=0.284 is obtained by dividing the sum of the values $|y_{ext}|$ and $|y_{int}|$ at this location x/c=0.284 according to Table 1 through the length c of the airfoil 1a in chord direction. Therein, $|y_{int}|$ defines approximately 28.5% of the maximum thickness and $|y_{ext}|$ approximately 71.5% thereof. If now, by way of example, a maximum thickness to chord ratio of 15% should be realized, the values $|y_{ext}|$ and $|y_{int}|$ at the location x/c=0.284 according to Table 1 are rescaled such that the sum of the values $|y_{ext}|$ and $|y_{int}|$ at this location x/c=0.284 according to Table 1 divided through the length c of the airfoil 1a in chord direction amounts to 15%, wherein $|y_{int}|$ still defines approximately 28.5% of the maximum thickness and $|y_{ext}|$ approximately 71.5%. Such a rescaling is then correspondingly applied to all other values of Table 1 for obtaining an airfoil with the maximum thickness to chord ratio of 15%.

It should be noted that the rescaling for obtention of the airfoil with a maximum thickness to chord ratio of 15% is described above only by way of example and can similarly be applied to all other airfoils and maximum thickness to chord ratios described in the present patent application. However, for brevity and conciseness, the explanation of such a rescaling for other airfoils and maximum thickness to chord ratios will not be repeated hereinafter.

Figure 2:
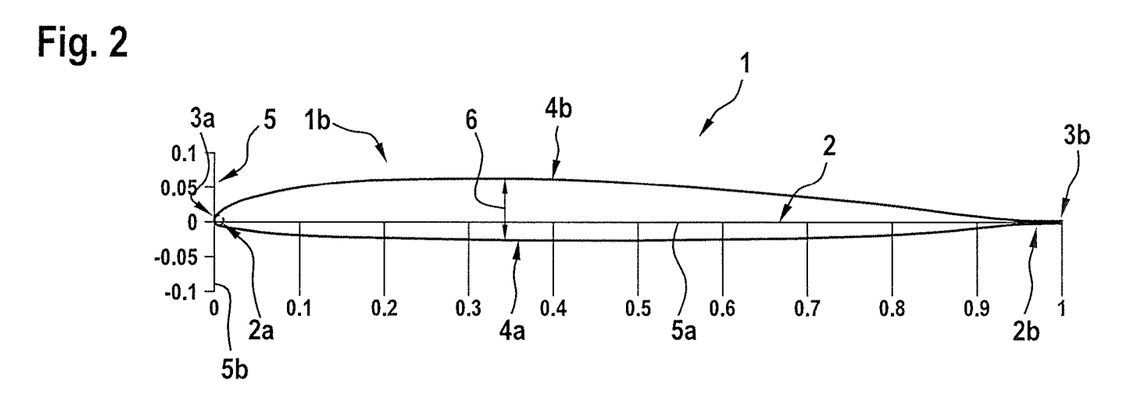
FIG. 2 shows a sectional view of the rotor blade of FIG. 1 with an airfoil having a maximum thickness to chord ratio of 9%.

FIG. 2 shows the rotor blade 1 of FIG. 1 that is now provided with an airfoil 1b according to a second aspect of the present invention, instead of the airfoil 1a of FIG. 1. For brevity and conciseness, however, only the differences between this airfoil 1b and the airfoil 1a of FIG. 1 are described in detail hereinafter.

In contrast to the airfoil 1a of FIG. 1, the airfoil 1b preferably comprises a maximum thickness to chord ratio of 9% and the predetermined intrados coordinate value pairs x/c, $y_{int}/c$ and the predetermined extrados coordinate value pairs x/c, $y_{ext}/c$ of the airfoil 1b are defined according to Table 2 above, with c now being a length of the airfoil 1b in chord direction. A chordwise position of the maximum thickness 6 of the airfoil 1b is illustrated on the basis of Table 2 above at the location x/c=0.349.

Furthermore, while the predetermined intrados coordinate value pairs x/c, $y_{int}/c$ and the predetermined extrados coordinate value pairs x/c, $y_{ext}/c$ of the airfoil 1b are determined in the region of the leading edge 3a similar to the airfoil 1a of FIG. 1 on the basis of the leading edge circle 2a, the latter now preferably comprises a radius r with r/c=0.00481. The center of circle of the leading edge circle 2a of the airfoil 1b is now preferably located at x/c=0.00481 and $y_{ext}/c=0.00008$.

Finally, it should be noted that Table 2 above is illustrated by way of example with respect to the airfoil 1b having a maximum thickness to chord ratio of 9%. However, this airfoil 1b and, consequently Table 2, may also be used as a reference for defining other airfoils for rotor blades of rotary wing aircrafts with other maximum thickness to chord ratios. According to one aspect of the present invention, the airfoil 1b is used as a reference airfoil for determining intrados coordinate value pairs and extrados coordinate value pairs for an airfoil that comprises a maximum thickness to chord ratio within a range from 7% to 12%.

Figure 3:
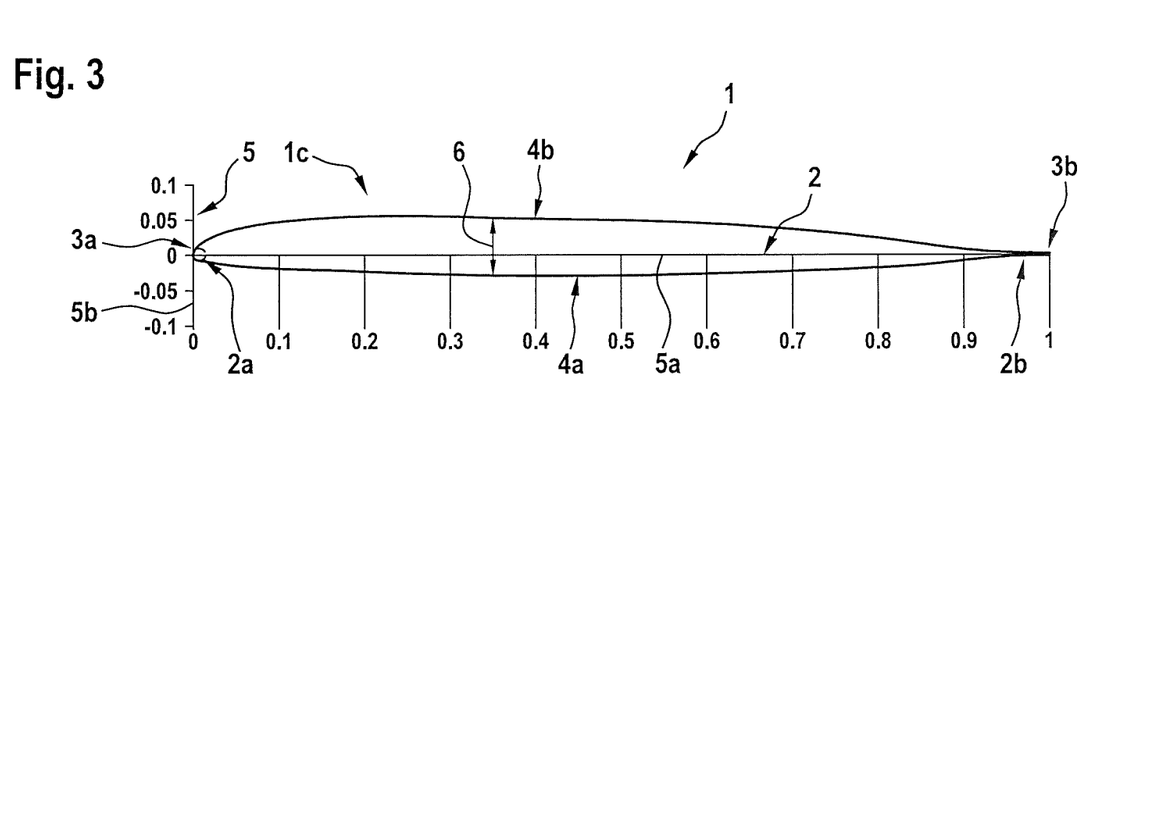
FIG. 3 shows a sectional view of the rotor blade of FIG. 1 with an airfoil having a maximum thickness to chord ratio of 8%.

FIG. 3 shows the rotor blade 1 of FIG. 1 that is now provided with an airfoil 1c according to a third aspect of the present invention, instead of the airfoil 1a of FIG. 1. For brevity and conciseness, however, only the differences between this airfoil 1c and the airfoil 1a of FIG. 1 are described in detail hereinafter.

In contrast to the airfoil 1a of FIG. 1, the airfoil 1c preferably comprises a maximum thickness to chord ratio of 8% and the predetermined intrados coordinate value pairs x/c, $y_{int}/c$ and the predetermined extrados coordinate value pairs x/c, $y_{ext}/c$ of the airfoil 1b are defined according to Table 3 above, with c now being a length of the airfoil 1c in chord direction. A chordwise position of the maximum thickness 6 of the airfoil 1c is illustrated on the basis of Table 3 above at the location x/c=0.353.

Furthermore, while the predetermined intrados coordinate value pairs x/c, $y_{int}/c$ and the predetermined extrados coordinate value pairs x/c, $y_{ext}/c$ of the airfoil 1c are determined in the region of the leading edge 3a similar to the airfoil 1a of FIG. 1 on the basis of the leading edge circle 2a, the latter now preferably comprises a radius r with r/c=0.00502. The center of circle of the leading edge circle 2a of the airfoil 1c is now preferably located at x/c=0.00502 and $y_{ext}/c$=0.00028.

Finally, it should be noted that Table 3 above is illustrated by way of example with respect to the airfoil 1c having a maximum thickness to chord ratio of 8%. However, this airfoil 1c and, consequently Table 3, may also be used as a reference for defining other airfoils for rotor blades of rotary wing aircrafts with other maximum thickness to chord ratios. According to one aspect of the present invention, the airfoil 1c is used as a reference airfoil for determining intrados coordinate value pairs and extrados coordinate value pairs for an airfoil that comprises a maximum thickness to chord ratio within a range from 6% to 10%.

In the following, the inventive airfoils according to FIG. 1 to FIG. 3 above are compared to conventional airfoils. By way of example, the airfoils with maximum thickness to chord ratios of 12% and 9% according to tables 3 and 5, respectively, of the document U.S. Pat. No. 6,361,279 B1 are selected as the conventional airfoils.

Figure 4:
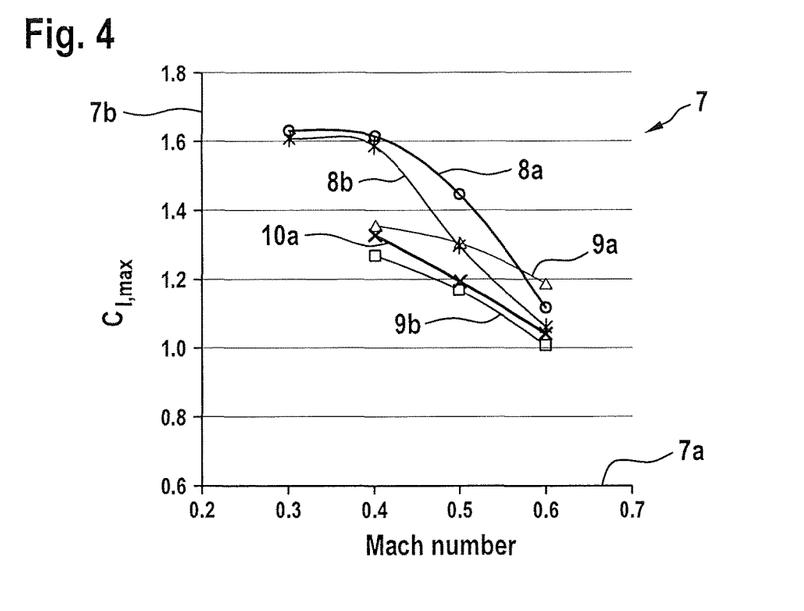
FIG. 4 shows a maximum lift coefficient diagram for the airfoils of FIG. 1 to FIG. 3.

FIG. 4 shows a maximum lift coefficient diagram 7 with maximum lift coefficients $C_{l, max}$ outlined on a maximum lift coefficient axis 7b, which are plotted over Mach numbers outlined on a Mach number axis 7a. The maximum lift coefficient diagram 7 illustrates three exemplary rotor blade airfoil characteristic curves 8a, 9a, 10a for demonstrating maximum lift coefficients that can be obtained in operation when applying the airfoils 1a, 1b, 1c of FIG. 1 to FIG. 3. More specifically, the characteristic curve 8a illustrates maximum lift coefficients of the 12% airfoil 1a of FIG. 1, the characteristic curve 9a illustrates maximum lift coefficients of the 9% airfoil 1b of FIG. 2 and the characteristic curve 10a illustrates maximum lift coefficients of the 8% airfoil 1c of FIG. 3.

The maximum lift coefficient diagram 7 further illustrates two exemplary rotor blade airfoil characteristic curves 8b, 9b for demonstrating maximum lift coefficients that can be obtained in operation when applying conventional airfoils. More specifically, the characteristic curve 8b illustrates maximum lift coefficients of a conventional 12% airfoil and the characteristic curve 9b illustrates maximum lift coefficients of a conventional 9% airfoil.

FIG. 4 is intended to allow a comparison between the characteristic curves 8a and 8b as well as 9a and 9b. As can be seen from this comparison, higher maximum lift coefficients can be obtained with the 12% airfoil 1a of FIG. 1 and the 9% airfoil 1b of FIG. 2, than with the corresponding conventional airfoils in the illustrated Mach number range from 0.3 to 0.6 for the 12% airfoil, respectively 0.4 to 0.6 for the 9% airfoil. Furthermore, even the 8% airfoil 1c of FIG. 3 allows to achieve higher maximum lift coefficients in the illustrated Mach number range from 0.4 to 0.6 than those that are obtained with the conventional 9% airfoil, as can be seen from a comparison of the characteristic curves 10a and 9b.

Figure 5:
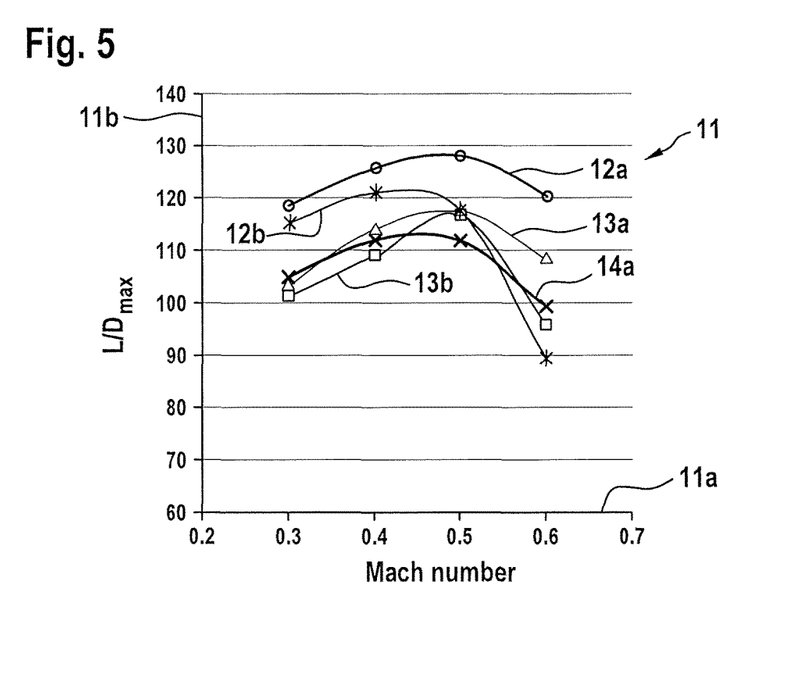
FIG. 5 shows a maximum lift to drag ratio diagram for the airfoils of FIG. 1 to FIG. 3.

FIG. 5 shows a maximum lift to drag ratio diagram 11 with maximum lift to drag ratios $L/D_{max}$ outlined on a maximum lift to drag ratio axis 11b, which are plotted over Mach numbers outlined on a Mach number axis 11a. The maximum lift to drag ratio diagram 11 illustrates three exemplary rotor blade airfoil characteristic curves 12a, 13a, 14a for demonstrating maximum lift to drag ratios that can be obtained in operation when applying the airfoils 1a, 1b, 1c of FIG. 1 to FIG. 3. More specifically, the characteristic curve 12a illustrates maximum lift to drag ratios of the 12% airfoil 1a of FIG. 1, the characteristic curve 13a illustrates maximum lift to drag ratios of the 9% airfoil 1b of FIG. 2 and the characteristic curve 14a illustrates maximum lift to drag ratios of the 8% airfoil 1c of FIG. 3.

The maximum lift to drag ratio diagram 11 further illustrates two exemplary rotor blade airfoil characteristic curves 12b, 13b for demonstrating maximum lift to drag ratios that can be obtained in operation when applying conventional airfoils. More specifically, the characteristic curve 12b illustrates maximum lift to drag ratios of a conventional 12% airfoil and the characteristic curve 13b illustrates maximum lift to drag ratios of a conventional 9% airfoil.

FIG. 5 is intended to allow a comparison between the characteristic curves 12a and 12b as well as 13a and 13b. As can be seen from this comparison, higher maximum lift to drag ratios can be obtained with the 12% airfoil 1a of FIG. 1 and the 9% airfoil 1b of FIG. 2, than with the corresponding conventional airfoils in the illustrated Mach number range from 0.3 to 0.6. Furthermore, even the 8% airfoil 1c of FIG. 3 allows to achieve higher maximum lift to drag ratios in the illustrated Mach number range from 0.3 to 0.6, except for the Mach number 0.5, than those that are obtained with the conventional 9% airfoil, as can be seen from a comparison of the characteristic curves 14a and 13b.

Figure 6:
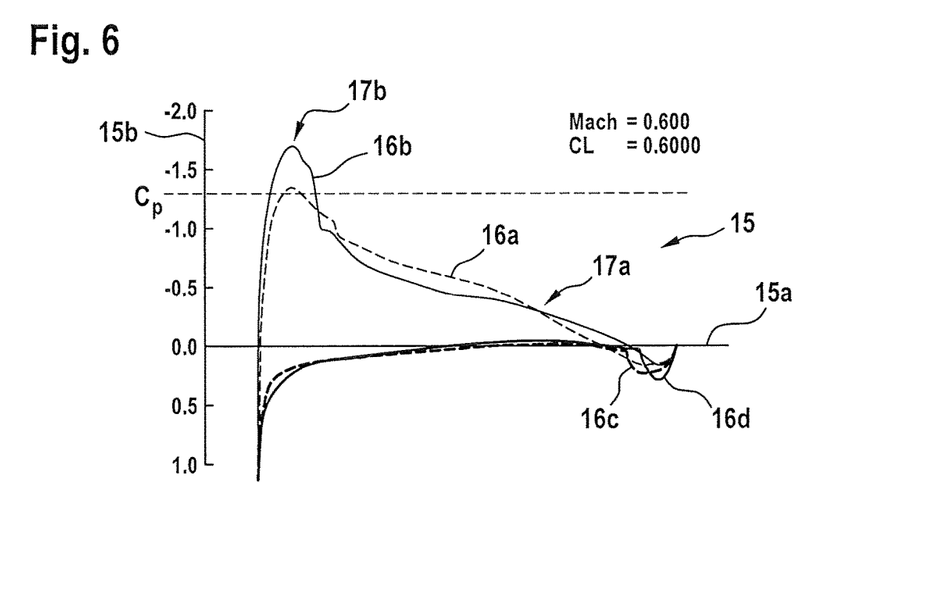
FIG. 6 shows a pressure coefficient diagram for the airfoil of FIG. 2.

FIG. 6 shows a pressure coefficient diagram 15 with pressure coefficients $C_p$ outlined on a pressure coefficient axis 15b, which are plotted over an underlying chord length outlined on a chord axis 15a. The pressure coefficient diagram 15 illustrates two exemplary rotor blade airfoil characteristic curves 16a, 16c for demonstrating pressure coefficients that can be obtained in operation when applying the airfoil 1b of FIG. 2. More specifically, the characteristic curve 16a illustrates pressure coefficients obtained at the extrados 4b of the 9% airfoil 1b of FIG. 2 and the characteristic curve 16c illustrates pressure coefficients obtained at the intrados 4a of the 9% airfoil 1b of FIG. 2.

The pressure coefficient diagram 15 further illustrates two exemplary rotor blade airfoil characteristic curves 16b, 16d for demonstrating pressure coefficients that can be obtained in operation when applying conventional airfoils. More specifically, the characteristic curve 16b illustrates pressure coefficients obtained at the extrados of a conventional 9% airfoil and the characteristic curve 16d illustrates pressure coefficients obtained at the intrados of a conventional 9% airfoil.

FIG. 6 is intended to allow a comparison between the characteristic curves 16a and 16b as well as 16c and 16d. As can be seen in particular from a comparison of the characteristic curves 16a and 16b, suction peaks 17b on the extrados 4b of the 9% airfoil 1b of FIG. 2 are significantly smaller than on the extrados of the conventional 9% airfoil, thereby allowing for higher maximum lift coefficients at moderate Mach numbers, as illustrated in FIG. 4, and further allowing the reduction of transonic shocks at high lift coefficients. Furthermore, a geometrically defined main pressure recovery 17a is introduced at a downstream position of the extrados 4b of the 9% airfoil 1b of FIG. 2 compared to the conventional 9% airfoil, thus allowing for a reduced aerodynamic drag due to an extended laminar running length on the extrados 4b of the 9% airfoil 1b of FIG. 2.

Figure 7:
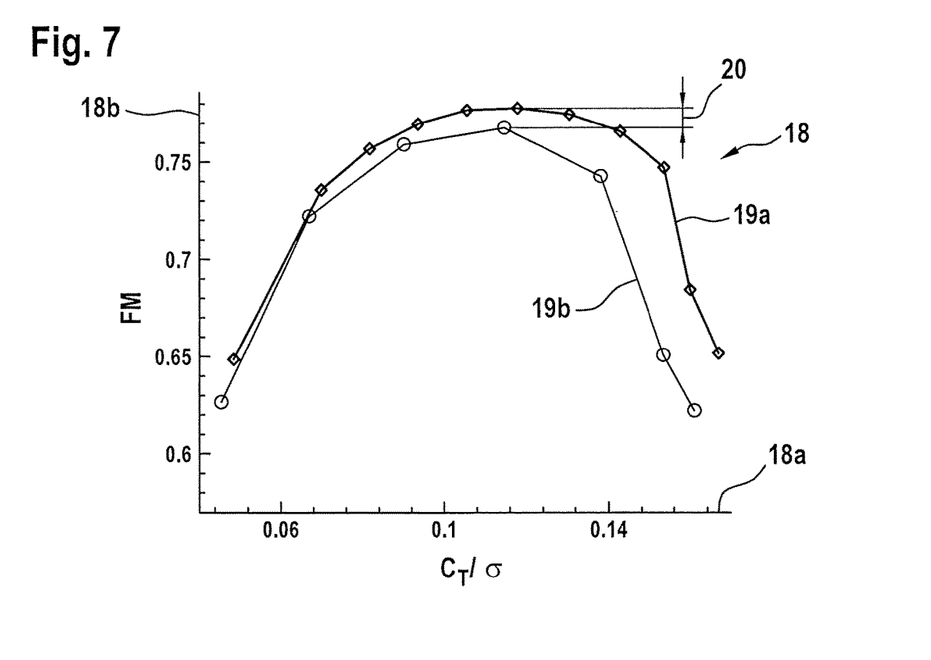
FIG. 7 shows a rotor figure of merit for rotor blades having the airfoils of FIG. 1 and FIG. 2.

FIG. 7 shows a rotor figure of merit 18 with figure of merit values FM outlined on a figure of merit axis 18b, which are plotted over blade loading values $C_T/\sigma$ outlined on a blade loading axis 18a. The rotor figure of merit 18 illustrates an exemplary rotor blade characteristic curve 19a for demonstrating figure of merit values that can be obtained in operation when applying the 12% airfoil 1a of FIG. 1 and the 9% airfoil 1b of FIG. 2 in a single rotor blade, e. g. the rotor blade 1 of FIG. 1 and FIG. 2. The rotor figure of merit 18 further illustrates an exemplary rotor blade characteristic curve 19b for demonstrating figure of merit values that can be obtained in operation when applying conventional 9% and 12% airfoils in a single rotor blade.

When comparing the characteristic curves 19a, 19b, it can be seen that a gain 20 of approximately 1% can be achieved. Moreover, the single rotor blade with the 12% airfoil 1a of FIG. 1 and the 9% airfoil 1b of FIG. 2 can further be improved according to one aspect of the present invention by applying the 8% airfoil 1c of FIG. 3 in a corresponding blade tip region thereof in order to alleviate transonic shocks at a respectively advancing blade side of the single rotor blade in operation in case of high speed forward flight. More specifically, replacement of the conventional 9% and 12% airfoils by the 9% and 12% airfoils 1a, 1b of FIG. 1 and FIG. 2 on an exemplary rotor—with identical planform shape, twist and radial thickness distribution—advantageously leads to an improved hover performance in terms of 'Figure of merit'.

It should be noted that modifications to the above described embodiments are within the common knowledge of the person skilled in the art and, thus, also considered as being part of the present invention. For instance, according to FIG. 1 to FIG. 3 described above, the rotor blade 1 of a rotary wing aircraft is respectively provided with one of the airfoils 1a, 1b, 1c. However, the rotor blade 1 may likewise be provided with two of the airfoils 1a, 1b, 1c, as well as all three airfoils 1a, 1b, 1c, as described above with respect to FIG. 7.

REFERENCE LIST 1 rotor blade
1a 12% rotor blade airfoil
1b 9% rotor blade airfoil
1c 8% rotor blade airfoil
2 airfoil chord
2a leading edge circle
2b trailing edge tab
3a airfoil leading edge
3b airfoil trailing edge
4a intrados
4b extrados
5 airfoil coordinate system
5a x-axis
5b y-axis
6 maximum thickness
7 maximum lift coefficient diagram
7a Mach number axis
7b maximum lift coefficient axis
8a 12% rotor blade airfoil characteristic curve
8b conventional 12% rotor blade airfoil characteristic curve
9a 9% rotor blade airfoil characteristic curve
9b conventional 9% rotor blade airfoil characteristic curve
10a 8% rotor blade airfoil characteristic curve
11 maximum lift to drag ratio diagram
11a Mach number axis
11b maximum lift to drag ratio axis
12a 12% rotor blade airfoil characteristic curve
12b conventional 12% rotor blade airfoil characteristic curve
13a 9% rotor blade airfoil characteristic curve
13b conventional 9% rotor blade airfoil characteristic curve
14a 8% rotor blade airfoil characteristic curve
15 pressure coefficient diagram
15a chord axis
15b pressure coefficient axis
16a 9% rotor blade airfoil extrados characteristic curve
16b conventional 9% rotor blade airfoil extrados characteristic curve
16c 9% rotor blade airfoil intrados characteristic curve
16d conventional 9% rotor blade airfoil intrados characteristic curve
17a main pressure recovery location
17b suction peak location
18 rotor figure of merit
18a blade loading axis
18b figure of merit axis
19a rotor blade with 9% and 12% airfoil characteristic curve
19b conventional rotor blade with 9% and 12% airfoil characteristic curve
20 1% gain in figure of merit

What is claimed is:

1. An airfoil for a rotor blade of a rotary wing aircraft, the airfoil having a maximum thickness to chord ratio of 12% and comprising, between a leading edge and a trailing edge, an extrados and an intrados, the intrados being defined by predetermined intrados coordinate value pairs x/c, $y_{int}/c$ and the extrados being defined by predetermined extrados coordinate value pairs x/c, $y_{ext}/c$, wherein x is a distance from the leading edge to the trailing edge along a chord line of the airfoil, c is a length of the airfoil in chord direction, $y_{int}$ is a distance between the chord line and a respective intrados surface and $y_{ext}$ is a distance between the chord line and a respective extrados surface, wherein the predetermined intrados coordinate value pairs x/c, $y_{int}/c$ and the predetermined extrados coordinate value pairs x/c, $y_{ext}/c$ are as follows:

| x/c | $y_{int}/c$ | x/c | $y_{ext}/c$ |
| --- | --- | --- | --- |
| 0.000000 | 0.000000 | 0.000000 | 0.000000 |
| 0.000077 | −0.001398 | 0.000077 | 0.001446 |
| 0.000307 | −0.002749 | 0.000306 | 0.002940 |
| 0.000690 | −0.004055 | 0.000689 | 0.004483 |
| 0.001226 | −0.005315 | 0.001226 | 0.006071 |
| 0.001915 | −0.006532 | 0.001914 | 0.007707 |
| 0.002756 | −0.007707 | 0.002756 | 0.009385 |
| 0.003750 | −0.008838 | 0.003750 | 0.011105 |
| 0.004897 | −0.009926 | 0.004896 | 0.012865 |
| 0.006195 | −0.010971 | 0.006194 | 0.014662 |
| 0.007644 | −0.011971 | 0.007644 | 0.016492 |
| 0.009245 | −0.012928 | 0.009244 | 0.018354 |
| 0.010996 | −0.013840 | 0.010995 | 0.020243 |
| 0.012897 | −0.014710 | 0.012896 | 0.022155 |
| 0.014947 | −0.015537 | 0.014947 | 0.024087 |
| 0.017146 | −0.016325 | 0.017146 | 0.026035 |
| 0.019494 | −0.017076 | 0.019494 | 0.027995 |
| 0.021989 | −0.017793 | 0.021989 | 0.029962 |
| 0.024631 | −0.018478 | 0.024630 | 0.031932 |
| 0.027418 | −0.019136 | 0.027418 | 0.033902 |
| 0.030351 | −0.019769 | 0.030351 | 0.035867 |
| 0.033429 | −0.020380 | 0.033428 | 0.037823 |
| 0.036649 | −0.020971 | 0.036649 | 0.039766 |
| 0.040012 | −0.021544 | 0.040012 | 0.041694 |
| 0.043517 | −0.022102 | 0.043517 | 0.043603 |
| 0.047162 | −0.022644 | 0.047162 | 0.045489 |
| 0.050946 | −0.023172 | 0.050946 | 0.047350 |
| 0.054869 | −0.023685 | 0.054868 | 0.049183 |
| 0.058929 | −0.024185 | 0.058928 | 0.050985 |
| 0.063124 | −0.024671 | 0.063124 | 0.052754 |
| 0.067454 | −0.025143 | 0.067454 | 0.054487 |
| 0.071918 | −0.025602 | 0.071917 | 0.056181 |
| 0.076514 | −0.026048 | 0.076513 | 0.057837 |
| 0.081240 | −0.026482 | 0.081239 | 0.059451 |
| 0.086096 | −0.026902 | 0.086095 | 0.061022 |
| 0.091079 | −0.027311 | 0.091078 | 0.062551 |
| 0.096189 | −0.027708 | 0.096188 | 0.064035 |
| 0.101424 | −0.028093 | 0.101423 | 0.065474 |
| 0.106782 | −0.028467 | 0.106781 | 0.066868 |
| 0.112262 | −0.028830 | 0.112261 | 0.068216 |
| 0.117862 | −0.029182 | 0.117862 | 0.069519 |
| 0.123581 | −0.029524 | 0.123580 | 0.070777 |
| 0.129416 | −0.029853 | 0.129416 | 0.071989 |
| 0.135367 | −0.030173 | 0.135366 | 0.073156 |
| 0.141431 | −0.030481 | 0.141430 | 0.074278 |
| 0.147607 | −0.030778 | 0.147606 | 0.075355 |
| 0.153892 | −0.031064 | 0.153891 | 0.076387 |
| 0.160285 | −0.031338 | 0.160284 | 0.077373 |
| 0.166784 | −0.031601 | 0.166783 | 0.078315 |
| 0.173388 | −0.031852 | 0.173387 | 0.079210 |
| 0.180093 | −0.032092 | 0.180092 | 0.080058 |
| 0.186899 | −0.032319 | 0.186898 | 0.080856 |
| 0.193802 | −0.032535 | 0.193802 | 0.081606 |
| 0.200802 | −0.032739 | 0.200801 | 0.082302 |
| 0.207896 | −0.032930 | 0.207895 | 0.082944 |
| 0.215082 | −0.033110 | 0.215081 | 0.083529 |
| 0.222358 | −0.033276 | 0.222357 | 0.084054 |
| 0.229722 | −0.033431 | 0.229721 | 0.084516 |
| 0.237171 | −0.033574 | 0.237170 | 0.084914 |
| 0.244703 | −0.033703 | 0.244702 | 0.085243 |
| 0.252317 | −0.033819 | 0.252316 | 0.085502 |
| 0.260010 | −0.033924 | 0.260009 | 0.085689 |
| 0.267779 | −0.034017 | 0.267778 | 0.085805 |
| 0.275622 | −0.034096 | 0.275621 | 0.085848 |
| 0.283538 | −0.034166 | 0.283537 | 0.085821 |
| 0.291523 | −0.034222 | 0.291522 | 0.085722 |
| 0.299575 | −0.034269 | 0.299574 | 0.085557 |
| 0.307693 | −0.034304 | 0.307692 | 0.085328 |
| 0.315873 | −0.034330 | 0.315872 | 0.085037 |
| 0.324113 | −0.034346 | 0.324112 | 0.084689 |
| 0.332411 | −0.034353 | 0.332410 | 0.084288 |
| 0.340764 | −0.034350 | 0.340763 | 0.083837 |
| 0.349170 | −0.034340 | 0.349169 | 0.083342 |
| 0.357627 | −0.034321 | 0.357626 | 0.082805 |
| 0.366131 | −0.034294 | 0.366130 | 0.082231 |
| 0.374680 | −0.034259 | 0.374679 | 0.081625 |
| 0.383273 | −0.034214 | 0.383272 | 0.080987 |
| 0.391905 | −0.034163 | 0.391905 | 0.080323 |
| 0.400576 | −0.034103 | 0.400575 | 0.079635 |
| 0.409282 | −0.034035 | 0.409281 | 0.078926 |
| 0.418020 | −0.033958 | 0.418019 | 0.078196 |
| 0.426788 | −0.033873 | 0.426787 | 0.077447 |
| 0.435584 | −0.033779 | 0.435583 | 0.076679 |
| 0.444405 | −0.033678 | 0.444404 | 0.075896 |
| 0.453248 | −0.033567 | 0.453247 | 0.075093 |
| 0.462110 | −0.033448 | 0.462109 | 0.074273 |
| 0.470990 | −0.033322 | 0.470989 | 0.073436 |
| 0.479884 | −0.033187 | 0.479883 | 0.072580 |
| 0.488790 | −0.033045 | 0.488789 | 0.071707 |
| 0.497705 | −0.032894 | 0.497705 | 0.070816 |
| 0.506627 | −0.032735 | 0.506626 | 0.069907 |
| 0.515553 | −0.032568 | 0.515552 | 0.068981 |
| 0.524480 | −0.032393 | 0.524479 | 0.068037 |
| 0.533405 | −0.032210 | 0.533405 | 0.067076 |
| 0.542327 | −0.032017 | 0.542326 | 0.066097 |
| 0.551242 | −0.031818 | 0.551242 | 0.065104 |
| 0.560148 | −0.031609 | 0.560147 | 0.064093 |
| 0.569042 | −0.031394 | 0.569042 | 0.063069 |
| 0.577921 | −0.031169 | 0.577920 | 0.062029 |
| 0.586785 | −0.030936 | 0.586784 | 0.060976 |
| 0.595627 | −0.030694 | 0.595627 | 0.059910 |
| 0.604448 | −0.030445 | 0.604447 | 0.058833 |
| 0.613244 | −0.030187 | 0.613243 | 0.057745 |
| 0.622012 | −0.029919 | 0.622011 | 0.056647 |
| 0.630750 | −0.029641 | 0.630750 | 0.055540 |
| 0.639456 | −0.029355 | 0.639455 | 0.054426 |
| 0.648126 | −0.029059 | 0.648125 | 0.053303 |
| 0.656759 | −0.028751 | 0.656758 | 0.052171 |
| 0.665351 | −0.028433 | 0.665350 | 0.051030 |
| 0.673900 | −0.028103 | 0.673900 | 0.049879 |
| 0.682404 | −0.027759 | 0.682404 | 0.048717 |
| 0.690861 | −0.027402 | 0.690860 | 0.047544 |
| 0.699266 | −0.027028 | 0.699266 | 0.046357 |
| 0.707619 | −0.026640 | 0.707619 | 0.045158 |
| 0.715917 | −0.026232 | 0.715917 | 0.043942 |
| 0.724157 | −0.025804 | 0.724157 | 0.042711 |
| 0.732337 | −0.025356 | 0.732336 | 0.041464 |
| 0.740454 | −0.024883 | 0.740454 | 0.040199 |
| 0.748506 | −0.024388 | 0.748506 | 0.038920 |
| 0.756491 | −0.023867 | 0.756491 | 0.037626 |
| 0.764407 | −0.023322 | 0.764406 | 0.036317 |
| 0.772250 | −0.022751 | 0.772249 | 0.034996 |
| 0.780019 | −0.022156 | 0.780018 | 0.033664 |
| 0.787710 | −0.021536 | 0.787710 | 0.032324 |
| 0.795324 | −0.020893 | 0.795324 | 0.030978 |
| 0.802856 | −0.020227 | 0.802856 | 0.029628 |
| 0.810305 | −0.019541 | 0.810305 | 0.028278 |
| 0.817668 | −0.018834 | 0.817668 | 0.026929 |
| 0.824944 | −0.018109 | 0.824944 | 0.025584 |
| 0.832130 | −0.017366 | 0.832129 | 0.024246 |
| 0.839223 | −0.016608 | 0.839223 | 0.022916 |
| 0.846223 | −0.015835 | 0.846223 | 0.021597 |
| 0.853126 | −0.015050 | 0.853126 | 0.020291 |
| 0.859932 | −0.014255 | 0.859931 | 0.019000 |
| 0.866637 | −0.013451 | 0.866636 | 0.017726 |
| 0.873240 | −0.012643 | 0.873239 | 0.016472 |
| 0.879738 | −0.011831 | 0.879738 | 0.015238 |
| 0.886131 | −0.011019 | 0.886131 | 0.014030 |
| 0.892416 | −0.010213 | 0.892416 | 0.012851 |
| 0.898591 | −0.009416 | 0.898591 | 0.011704 |
| 0.904655 | −0.008633 | 0.904655 | 0.010596 |
| 0.910605 | −0.007871 | 0.910605 | 0.009532 |
| 0.916440 | −0.007134 | 0.916440 | 0.008516 |
| 0.922158 | −0.006430 | 0.922158 | 0.007556 |
| 0.927758 | −0.005764 | 0.927758 | 0.006655 |
| 0.933238 | −0.005141 | 0.933237 | 0.005821 |
| 0.938595 | −0.004564 | 0.938595 | 0.005056 |
| 0.943830 | −0.004039 | 0.943830 | 0.004363 |
| 0.948939 | −0.003564 | 0.948939 | 0.003743 |
| 0.953922 | −0.003142 | 0.953922 | 0.003197 |
| 0.956325 | −0.002953 | 0.958777 | 0.002723 |
| 0.959739 | −0.002725 | 0.963503 | 0.002318 |
| 0.963158 | −0.002563 | 0.968098 | 0.001979 |
| 0.966579 | −0.002457 | 0.970001 | 0.001854 |
| 0.970001 | −0.002402 | 0.976001 | 0.001909 |
| 0.976001 | −0.002347 | 0.982001 | 0.001964 |

-continued

| x/c | $y_{int}/c$ | x/c | $y_{ext}/c$ |
|---|---|---|---|
| 0.982001 | −0.002293 | 0.988001 | 0.002019 |
| 0.988001 | −0.002238 | 0.994000 | 0.002073 |
| 0.994000 | −0.002183 | 1.000000 | 0.002128 |
| 1.000000 | −0.002128 | | | wherein a maximum error of each one of the predetermined intrados coordinate value pairs x/c, $y_{int}/c$ and the predetermined extrados coordinate value pairs x/c, $y_{ext}/c$ amounts to ±3%.

2. An airfoil for a rotor blade of a rotary wing aircraft, the airfoil having a maximum thickness to chord ratio within a range from 9% to 15% and comprising intrados coordinate value pairs and extrados coordinate value pairs that are determined on the basis of a reference airfoil, the reference airfoil being defined by the airfoil according to claim 1.

3. The airfoil according to claim 1, wherein an associated leading edge radius of a leading edge circle that defines an underlying curvature at the leading edge of the airfoil amounts to r/c=0.01314, the leading edge circle having its associated center of circle located at x/c=0.01314 and $y_{int}/c=y_{ext}/c=0.00000$.

4. The airfoil according to claim 1, wherein a trailing edge tab is provided at the trailing edge of the airfoil, the trailing edge tab being defined by an at least essentially straight and parallel intrados and extrados.

5. The airfoil according to claim 4, wherein the trailing edge tab comprises a length in a range from 2% to 10% of the length of the airfoil in chord direction with a maximum inclination error of ±5° relative to the chord line of the airfoil.

6. A rotor blade of a rotary wing aircraft, the rotor blade comprising at least one airfoil according to claim 1.

7. An airfoil for a rotor blade of a rotary wing aircraft, the airfoil having a maximum thickness to chord ratio of 9% and comprising, between a leading edge and a trailing edge, an extrados and an intrados, the intrados being defined by predetermined intrados coordinate value pairs x/c, $y_{int}/c$ and the extrados being defined by predetermined extrados coordinate value pairs x/c, $y_{ext}/c$, wherein x is a distance from the leading edge to the trailing edge along a chord line of the airfoil, c is a length of the airfoil in chord direction, $y_{int}$ is a distance between the chord line and a respective intrados surface and $y_{ext}$ is a distance between the chord line and a respective extrados surface, wherein the predetermined intrados coordinate value pairs x/c, $y_{int}/c$ and the predetermined extrados coordinate value pairs x/c, $y_{ext}/c$ are as follows:

| x/c | $y_{int}/c$ | x/c | $y_{ext}/c$ |
|---|---|---|---|
| 0.000000 | 0.000079 | 0.000000 | 0.000079 |
| 0.000100 | −0.000821 | 0.000100 | 0.001156 |
| 0.000400 | −0.001602 | 0.000400 | 0.002431 |
| 0.000901 | −0.002314 | 0.000901 | 0.003855 |
| 0.001601 | −0.002993 | 0.001601 | 0.005382 |
| 0.002500 | −0.003661 | 0.002500 | 0.006983 |
| 0.003599 | −0.004331 | 0.003599 | 0.008637 |
| 0.004896 | −0.005009 | 0.004896 | 0.010336 |
| 0.006392 | −0.005694 | 0.006392 | 0.012070 |
| 0.008086 | −0.006381 | 0.008086 | 0.013836 |
| 0.009977 | −0.007067 | 0.009977 | 0.015625 |
| 0.012063 | −0.007745 | 0.012063 | 0.017432 |
| 0.014346 | −0.008412 | 0.014346 | 0.019249 |
| 0.016823 | −0.009067 | 0.016823 | 0.021067 |
| 0.019494 | −0.009707 | 0.019494 | 0.022879 |
| 0.022357 | −0.010332 | 0.022357 | 0.024678 |
| 0.025412 | −0.010940 | 0.025412 | 0.026457 |
| 0.028658 | −0.011532 | 0.028658 | 0.028211 |
| 0.032092 | −0.012105 | 0.032092 | 0.029937 |
| 0.035714 | −0.012660 | 0.035714 | 0.031632 |
| 0.039523 | −0.013196 | 0.039523 | 0.033296 |
| 0.043517 | −0.013713 | 0.043517 | 0.034926 |
| 0.047694 | −0.014211 | 0.047694 | 0.036523 |
| 0.052053 | −0.014692 | 0.052053 | 0.038087 |
| 0.056592 | −0.015154 | 0.056592 | 0.039615 |
| 0.061309 | −0.015598 | 0.061309 | 0.041106 |
| 0.066203 | −0.016025 | 0.066203 | 0.042558 |
| 0.071272 | −0.016435 | 0.071272 | 0.043968 |
| 0.076513 | −0.016831 | 0.076513 | 0.045335 |
| 0.081926 | −0.017212 | 0.081926 | 0.046656 |
| 0.087506 | −0.017580 | 0.087506 | 0.047929 |
| 0.093254 | −0.017935 | 0.093254 | 0.049154 |
| 0.099165 | −0.018280 | 0.099165 | 0.050329 |
| 0.105239 | −0.018615 | 0.105239 | 0.051455 |
| 0.111472 | −0.018941 | 0.111472 | 0.052533 |
| 0.117862 | −0.019258 | 0.117862 | 0.053563 |
| 0.124407 | −0.019567 | 0.124407 | 0.054546 |
| 0.131105 | −0.019868 | 0.131105 | 0.055482 |
| 0.137952 | −0.020161 | 0.137952 | 0.056373 |
| 0.144946 | −0.020446 | 0.144946 | 0.057218 |
| 0.152085 | −0.020723 | 0.152085 | 0.058018 |
| 0.159365 | −0.020991 | 0.159365 | 0.058772 |
| 0.166784 | −0.021250 | 0.166784 | 0.059482 |
| 0.174339 | −0.021500 | 0.174339 | 0.060148 |
| 0.182027 | −0.021740 | 0.182027 | 0.060769 |
| 0.189845 | −0.021971 | 0.189845 | 0.061348 |
| 0.197791 | −0.022193 | 0.197791 | 0.061885 |
| 0.205860 | −0.022405 | 0.205860 | 0.062380 |
| 0.214050 | −0.022609 | 0.214050 | 0.062833 |
| 0.222358 | −0.022805 | 0.222358 | 0.063246 |
| 0.230781 | −0.022992 | 0.230781 | 0.063619 |
| 0.239314 | −0.023172 | 0.239314 | 0.063953 |
| 0.247956 | −0.023345 | 0.247956 | 0.064250 |
| 0.256703 | −0.023511 | 0.256703 | 0.064510 |
| 0.265551 | −0.023668 | 0.265551 | 0.064736 |
| 0.274497 | −0.023818 | 0.274497 | 0.064928 |
| 0.283537 | −0.023961 | 0.283537 | 0.065087 |
| 0.292669 | −0.024095 | 0.292669 | 0.065213 |
| 0.301888 | −0.024222 | 0.301888 | 0.065306 |
| 0.311191 | −0.024341 | 0.311191 | 0.065366 |
| 0.320574 | −0.024453 | 0.320574 | 0.065392 |
| 0.330034 | −0.024557 | 0.330034 | 0.065382 |
| 0.339567 | −0.024654 | 0.339567 | 0.065337 |
| 0.349170 | −0.024742 | 0.349170 | 0.065255 |
| 0.358838 | −0.024822 | 0.358838 | 0.065136 |
| 0.368569 | −0.024893 | 0.368569 | 0.064980 |
| 0.378357 | −0.024954 | 0.378357 | 0.064786 |
| 0.388201 | −0.025006 | 0.388201 | 0.064554 |
| 0.398095 | −0.025047 | 0.398095 | 0.064285 |
| 0.408036 | −0.025078 | 0.408036 | 0.063977 |
| 0.418020 | −0.025097 | 0.418020 | 0.063630 |
| 0.428043 | −0.025106 | 0.428043 | 0.063246 |
| 0.438102 | −0.025104 | 0.438102 | 0.062822 |
| 0.448192 | −0.025090 | 0.448192 | 0.062359 |
| 0.458310 | −0.025065 | 0.458310 | 0.061857 |
| 0.468451 | −0.025027 | 0.468451 | 0.061314 |
| 0.478613 | −0.024977 | 0.478613 | 0.060730 |
| 0.488790 | −0.024914 | 0.488790 | 0.060105 |
| 0.498979 | −0.024838 | 0.498979 | 0.059437 |
| 0.509177 | −0.024750 | 0.509177 | 0.058725 |
| 0.519378 | −0.024648 | 0.519378 | 0.057968 |
| 0.529580 | −0.024534 | 0.529580 | 0.057165 |
| 0.539778 | −0.024406 | 0.539778 | 0.056314 |
| 0.549969 | −0.024265 | 0.549969 | 0.055414 |
| 0.560148 | −0.024110 | 0.560148 | 0.054465 |
| 0.570312 | −0.023943 | 0.570312 | 0.053466 |
| 0.580456 | −0.023762 | 0.580456 | 0.052418 |
| 0.590577 | −0.023568 | 0.590577 | 0.051323 |
| 0.600670 | −0.023360 | 0.600670 | 0.050182 |
| 0.610733 | −0.023138 | 0.610733 | 0.048997 |
| 0.620761 | −0.022902 | 0.620761 | 0.047772 |
| 0.630750 | −0.022650 | 0.630750 | 0.046508 |

-continued

| x/c | $y_{int}/c$ | x/c | $y_{ext}/c$ |
| --- | --- | --- | --- |
| 0.640696 | −0.022383 | 0.640696 | 0.045209 |
| 0.650596 | −0.022100 | 0.650596 | 0.043880 |
| 0.660446 | −0.021799 | 0.660446 | 0.042523 |
| 0.670241 | −0.021482 | 0.670241 | 0.041142 |
| 0.679979 | −0.021146 | 0.679979 | 0.039742 |
| 0.689655 | −0.020793 | 0.689655 | 0.038325 |
| 0.699266 | −0.020421 | 0.699266 | 0.036897 |
| 0.708808 | −0.020030 | 0.708808 | 0.035460 |
| 0.718277 | −0.019619 | 0.718277 | 0.034019 |
| 0.727670 | −0.019188 | 0.727670 | 0.032577 |
| 0.736983 | −0.018734 | 0.736983 | 0.031138 |
| 0.746212 | −0.018256 | 0.746212 | 0.029705 |
| 0.755355 | −0.017751 | 0.755355 | 0.028280 |
| 0.764406 | −0.017218 | 0.764406 | 0.026864 |
| 0.773364 | −0.016653 | 0.773364 | 0.025461 |
| 0.782224 | −0.016056 | 0.782224 | 0.024070 |
| 0.790983 | −0.015426 | 0.790983 | 0.022693 |
| 0.799638 | −0.014765 | 0.799638 | 0.021332 |
| 0.808185 | −0.014075 | 0.808185 | 0.019986 |
| 0.816622 | −0.013359 | 0.816622 | 0.018658 |
| 0.824944 | −0.012623 | 0.824944 | 0.017349 |
| 0.833149 | −0.011872 | 0.833149 | 0.016061 |
| 0.841233 | −0.011110 | 0.841233 | 0.014799 |
| 0.849193 | −0.010343 | 0.849193 | 0.013565 |
| 0.857027 | −0.009576 | 0.857027 | 0.012365 |
| 0.864731 | −0.008815 | 0.864731 | 0.011204 |
| 0.872303 | −0.008066 | 0.872303 | 0.010088 |
| 0.879738 | −0.007335 | 0.879738 | 0.009023 |
| 0.887036 | −0.006632 | 0.887036 | 0.008016 |
| 0.894192 | −0.005964 | 0.894192 | 0.007072 |
| 0.901204 | −0.005340 | 0.901204 | 0.006198 |
| 0.908069 | −0.004767 | 0.908069 | 0.005400 |
| 0.914785 | −0.004253 | 0.914785 | 0.004684 |
| 0.921349 | −0.003800 | 0.921349 | 0.004056 |
| 0.927758 | −0.003413 | 0.927758 | 0.003520 |
| 0.934010 | −0.003091 | 0.934010 | 0.003077 |
| 0.940103 | −0.002832 | 0.940103 | 0.002727 |
| 0.946035 | −0.002633 | 0.946035 | 0.002463 |
| 0.951802 | −0.002490 | 0.951802 | 0.002276 |
| 0.957403 | −0.002395 | 0.957403 | 0.002153 |
| 0.962836 | −0.002339 | 0.962836 | 0.002083 |
| 0.968098 | −0.002311 | 0.968098 | 0.002049 |
| 0.973188 | −0.002302 | 0.973188 | 0.002039 |
| 0.978104 | −0.002303 | 0.978104 | 0.002042 |
| 0.982843 | −0.002309 | 0.982843 | 0.002052 |
| 0.987404 | −0.002316 | 0.987404 | 0.002064 |
| 0.991785 | −0.002323 | 0.991785 | 0.002074 |
| 0.995984 | −0.002328 | 0.995984 | 0.002084 |
| 1.000000 | −0.002332 | 1.000000 | 0.002092 | wherein a maximum error of each one of the predetermined intrados coordinate value pairs x/c, $y_{int}/c$ and the predetermined extrados coordinate value pairs x/c, $y_{ext}/c$ amounts to ±3%.

8. An airfoil for a rotor blade of a rotary wing aircraft, the airfoil having a maximum thickness to chord ratio within a range from 7% to 12% and comprising intrados coordinate value pairs and extrados coordinate value pairs that are determined on the basis of a reference airfoil, the reference airfoil being defined by the airfoil according to claim 7.

9. The airfoil according to claim 7, wherein an associated leading edge radius of a leading edge circle that defines an underlying curvature at the leading edge of the airfoil amounts to r/c=0.00481, the leading edge circle having its associated center of circle located at x/c=0.00481 and $y_{ext}/c$=0.00008.

10. The airfoil according to claim 7, wherein a trailing edge tab is provided at the trailing edge of the airfoil, the trailing edge tab being defined by an at least essentially straight and parallel intrados and extrados.

11. The airfoil according to claim 10, wherein the trailing edge tab comprises a length in a range from 2% to 10% of the length of the airfoil in chord direction with a maximum inclination error of ±5° relative to the chord line of the airfoil.

12. An airfoil for a rotor blade of a rotary wing aircraft, the airfoil having a maximum thickness to chord ratio of 8% and comprising, between a leading edge and a trailing edge, an extrados and an intrados, the intrados being defined by predetermined intrados coordinate value pairs x/c, $y_{int}/c$ and the extrados being defined by predetermined extrados coordinate value pairs x/c, $y_{ext}/c$, wherein x is a distance from the leading edge to the trailing edge along a chord line of the airfoil, c is a length of the airfoil in chord direction, $y_{int}$ is a distance between the chord line and a respective intrados surface and $y_{ext}$ is a distance between the chord line and a respective extrados surface, characterized in that the predetermined intrados coordinate value pairs x/c, $y_{int}/c$ and the predetermined extrados coordinate value pairs x/c, $y_{ext}/c$ are as follows:

| x/c | $y_{int}/c$ | x/c | $y_{ext}/c$ |
| --- | --- | --- | --- |
| 0.000000 | 0.000215 | 0.000000 | 0.000215 |
| 0.000108 | −0.000757 | 0.000078 | 0.001200 |
| 0.000411 | −0.001747 | 0.000327 | 0.002240 |
| 0.000926 | −0.002750 | 0.000739 | 0.003360 |
| 0.001662 | −0.003727 | 0.001310 | 0.004558 |
| 0.002616 | −0.004655 | 0.002049 | 0.005839 |
| 0.003800 | −0.005525 | 0.002973 | 0.007227 |
| 0.005244 | −0.006340 | 0.004129 | 0.008754 |
| 0.006978 | −0.007128 | 0.005577 | 0.010448 |
| 0.009067 | −0.007908 | 0.007390 | 0.012337 |
| 0.011619 | −0.008697 | 0.009666 | 0.014451 |
| 0.014783 | −0.009530 | 0.012523 | 0.016812 |
| 0.018750 | −0.010418 | 0.016062 | 0.019413 |
| 0.023722 | −0.011352 | 0.020339 | 0.022198 |
| 0.029809 | −0.012304 | 0.025333 | 0.025063 |
| 0.036922 | −0.013230 | 0.030955 | 0.027888 |
| 0.044810 | −0.014099 | 0.037107 | 0.030586 |
| 0.053218 | −0.014906 | 0.043702 | 0.033107 |
| 0.061943 | −0.015652 | 0.050680 | 0.035432 |
| 0.070873 | −0.016345 | 0.058002 | 0.037567 |
| 0.079906 | −0.016990 | 0.065631 | 0.039529 |
| 0.088988 | −0.017593 | 0.073520 | 0.041336 |
| 0.098046 | −0.018154 | 0.081608 | 0.043000 |
| 0.107068 | −0.018678 | 0.089839 | 0.044528 |
| 0.116047 | −0.019169 | 0.098172 | 0.045923 |
| 0.124990 | −0.019632 | 0.106577 | 0.047188 |
| 0.133918 | −0.020068 | 0.115037 | 0.048325 |
| 0.142864 | −0.020484 | 0.123550 | 0.049337 |
| 0.151836 | −0.020880 | 0.132127 | 0.050232 |
| 0.160857 | −0.021259 | 0.140777 | 0.051020 |
| 0.169928 | −0.021623 | 0.149509 | 0.051716 |
| 0.179052 | −0.021972 | 0.158319 | 0.052338 |
| 0.188212 | −0.022307 | 0.167169 | 0.052894 |
| 0.197390 | −0.022628 | 0.176050 | 0.053383 |
| 0.206574 | −0.022937 | 0.184960 | 0.053815 |
| 0.215752 | −0.023233 | 0.193877 | 0.054190 |
| 0.224921 | −0.023518 | 0.202805 | 0.054506 |
| 0.234080 | −0.023790 | 0.211741 | 0.054767 |
| 0.243213 | −0.024051 | 0.220690 | 0.054973 |
| 0.252331 | −0.024302 | 0.229653 | 0.055126 |
| 0.261430 | −0.024541 | 0.238634 | 0.055229 |
| 0.270527 | −0.024771 | 0.247642 | 0.055289 |
| 0.279620 | −0.024990 | 0.256664 | 0.055307 |
| 0.288732 | −0.025198 | 0.265716 | 0.055288 |
| 0.297858 | −0.025397 | 0.274800 | 0.055241 |
| 0.307010 | −0.025588 | 0.283904 | 0.055169 |
| 0.316188 | −0.025771 | 0.293030 | 0.055078 |
| 0.325380 | −0.025946 | 0.302179 | 0.054971 |
| 0.334565 | −0.026112 | 0.311343 | 0.054856 |
| 0.343733 | −0.026272 | 0.320511 | 0.054731 |
| 0.352895 | −0.026423 | 0.329689 | 0.054599 |
| 0.362062 | −0.026567 | 0.338869 | 0.054462 |
| 0.371226 | −0.026705 | 0.348043 | 0.054319 |
| 0.380408 | −0.026835 | 0.357211 | 0.054168 |
| 0.389592 | −0.026960 | 0.366378 | 0.054008 |

| x/c | $y_{int}/c$ | x/c | $y_{ext}/c$ |
|---|---|---|---|
| 0.398773 | −0.027082 | 0.375537 | 0.053840 |
| 0.407948 | −0.027194 | 0.384693 | 0.053659 |
| 0.417114 | −0.027296 | 0.393848 | 0.053468 |
| 0.426264 | −0.027388 | 0.403006 | 0.053265 |
| 0.435411 | −0.027472 | 0.412163 | 0.053052 |
| 0.444557 | −0.027545 | 0.421324 | 0.052828 |
| 0.453708 | −0.027610 | 0.430488 | 0.052595 |
| 0.462868 | −0.027663 | 0.439656 | 0.052354 |
| 0.472038 | −0.027705 | 0.448824 | 0.052104 |
| 0.481218 | −0.027736 | 0.457990 | 0.051848 |
| 0.490405 | −0.027757 | 0.467151 | 0.051581 |
| 0.499600 | −0.027765 | 0.476316 | 0.051306 |
| 0.508797 | −0.027761 | 0.485468 | 0.051024 |
| 0.517989 | −0.027743 | 0.494612 | 0.050728 |
| 0.527173 | −0.027713 | 0.503750 | 0.050418 |
| 0.536346 | −0.027668 | 0.512886 | 0.050095 |
| 0.545491 | −0.027609 | 0.522011 | 0.049757 |
| 0.554621 | −0.027536 | 0.531136 | 0.049400 |
| 0.563731 | −0.027444 | 0.540266 | 0.049029 |
| 0.572814 | −0.027339 | 0.549383 | 0.048643 |
| 0.581885 | −0.027215 | 0.558500 | 0.048237 |
| 0.590939 | −0.027072 | 0.567617 | 0.047814 |
| 0.599982 | −0.026910 | 0.576733 | 0.047374 |
| 0.609025 | −0.026731 | 0.585841 | 0.046918 |
| 0.618071 | −0.026516 | 0.594933 | 0.046442 |
| 0.627122 | −0.026269 | 0.604018 | 0.045944 |
| 0.636179 | −0.025988 | 0.613076 | 0.045422 |
| 0.645255 | −0.025677 | 0.622116 | 0.044865 |
| 0.654342 | −0.025340 | 0.631136 | 0.044278 |
| 0.663446 | −0.024980 | 0.640125 | 0.043651 |
| 0.672559 | −0.024601 | 0.649101 | 0.042983 |
| 0.681681 | −0.024204 | 0.658056 | 0.042268 |
| 0.690809 | −0.023791 | 0.667004 | 0.041505 |
| 0.699940 | −0.023364 | 0.675947 | 0.040692 |
| 0.709072 | −0.022922 | 0.684895 | 0.039831 |
| 0.718204 | −0.022468 | 0.693854 | 0.038922 |
| 0.727323 | −0.022000 | 0.702833 | 0.037972 |
| 0.736438 | −0.021514 | 0.711841 | 0.036986 |
| 0.745545 | −0.021011 | 0.720869 | 0.035967 |
| 0.754646 | −0.020488 | 0.729930 | 0.034916 |
| 0.763749 | −0.019946 | 0.739005 | 0.033838 |
| 0.772838 | −0.019385 | 0.748093 | 0.032735 |
| 0.781925 | −0.018800 | 0.757187 | 0.031610 |
| 0.791017 | −0.018195 | 0.766273 | 0.030463 |
| 0.800106 | −0.017569 | 0.775334 | 0.029305 |
| 0.809195 | −0.016921 | 0.784371 | 0.028132 |
| 0.818292 | −0.016252 | 0.793385 | 0.026950 |
| 0.827400 | −0.015566 | 0.802375 | 0.025754 |
| 0.836515 | −0.014864 | 0.811351 | 0.024551 |
| 0.845633 | −0.014148 | 0.820321 | 0.023336 |
| 0.854759 | −0.013419 | 0.829305 | 0.022108 |
| 0.863883 | −0.012681 | 0.838309 | 0.020864 |
| 0.872989 | −0.011934 | 0.847334 | 0.019607 |
| 0.882064 | −0.011172 | 0.856389 | 0.018334 |
| 0.891090 | −0.010393 | 0.865463 | 0.017051 |
| 0.900055 | −0.009580 | 0.874538 | 0.015760 |
| 0.908968 | −0.008727 | 0.883610 | 0.014463 |
| 0.917793 | −0.007820 | 0.892663 | 0.013166 |
| 0.926569 | −0.006869 | 0.901705 | 0.011868 |
| 0.935039 | −0.005887 | 0.910726 | 0.010564 |
| 0.943157 | −0.004809 | 0.919634 | 0.009266 |
| 0.950722 | −0.003725 | 0.928288 | 0.007973 |
| 0.958140 | −0.003014 | 0.936612 | 0.006671 |
| 0.965683 | −0.002577 | 0.944461 | 0.005343 |
| 0.973486 | −0.002486 | 0.952013 | 0.004032 |
| 0.981658 | −0.002497 | 0.959220 | 0.003090 |
| 0.989505 | −0.002498 | 0.966334 | 0.002578 |
| 0.996281 | −0.002499 | 0.973827 | 0.002484 |
| 1.000000 | −0.002500 | 0.981787 | 0.002497 |
|  |  | 0.989536 | 0.002498 |
|  |  | 0.996283 | 0.002499 |
|  |  | 1.000000 | 0.002500 | wherein a maximum error of each one of the predetermined intrados coordinate value pairs x/c, $y_{int}/c$ and the predetermined extrados coordinate value pairs x/c, $y_{ext}/c$ amounts to ±3%.

13. An airfoil for a rotor blade of a rotary wing aircraft, the airfoil having a maximum thickness to chord ratio within a range from 6% to 10% and comprising intrados coordinate value pairs and extrados coordinate value pairs that are determined on the basis of a reference airfoil, the reference airfoil being defined by the airfoil according to claim 12.

14. The airfoil according to claim 12, wherein an associated leading edge radius of a leading edge circle that defines an underlying curvature at the leading edge of the airfoil amounts to r/c=0.00502, the leading edge circle having its associated center of circle located at x/c=0.00502 and $y_{ext}/c$=0.00028.

15. The airfoil according to claim 12, wherein a trailing edge tab is provided at the trailing edge of the airfoil, the trailing edge tab being defined by an at least essentially straight and parallel intrados and extrados.

16. The airfoil according to claim 15, wherein the trailing edge tab comprises a length in a range from 2% to 10% of the length of the airfoil in chord direction with a maximum inclination error of ±5° relative to the chord line of the airfoil.

* * * * *